United States Patent
Kuroda

(10) Patent No.: US 10,093,312 B2
(45) Date of Patent: Oct. 9, 2018

(54) OBSTACLE DETERMINING APPARATUS, MOVING BODY, AND OBSTACLE DETERMINING METHOD

(71) Applicant: Sharp Kabushiki Kaisha, Osaka (JP)

(72) Inventor: Tatsuro Kuroda, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 94 days.

(21) Appl. No.: 15/218,646

(22) Filed: Jul. 25, 2016

(65) Prior Publication Data

US 2017/0028986 A1 Feb. 2, 2017

(30) Foreign Application Priority Data

Jul. 27, 2015 (JP) .................................. 2015-147358
Sep. 18, 2015 (JP) .................................. 2015-185415

(51) Int. Cl.
*B60W 30/09* (2012.01)
*G01S 7/497* (2006.01)
*G01S 17/02* (2006.01)
*G01S 17/42* (2006.01)
*G01S 17/89* (2006.01)
(Continued)

(52) U.S. Cl.
CPC ............. *B60W 30/09* (2013.01); *G01S 7/497* (2013.01); *G01S 17/023* (2013.01); *G01S 17/026* (2013.01); *G01S 17/42* (2013.01); *G01S 17/89* (2013.01); *G01S 17/936* (2013.01); *B60W 2550/10* (2013.01); *B60W 2720/10* (2013.01); *B60W 2900/00* (2013.01); *G01S 17/10* (2013.01); *G01S 17/36* (2013.01)

(58) Field of Classification Search
CPC ...... B60W 30/09; G01S 7/497; G01S 17/023; G01S 17/42; G01S 17/89; G01S 17/936

USPC .................................................. 701/70
See application file for complete search history.

(56) References Cited

U.S. PATENT DOCUMENTS

2010/0037418 A1* 2/2010 Hussey ..................... A47L 5/30
                                                                   15/319
2011/0309967 A1* 12/2011 Choe ....................... G05D 1/024
                                                                    342/54
(Continued)

FOREIGN PATENT DOCUMENTS

| JP | 2013-254474 A  |   | 12/2013 |
|----|----------------|---|---------|
| JP | 2013254474 A   | * | 12/2013 |
| JP | 2015-106254 A  |   | 6/2015  |

OTHER PUBLICATIONS

EPO english translation of JP2013254474A.*

Primary Examiner — Yazan A Soofi
(74) Attorney, Agent, or Firm — Renner Otto Boisselle & Sklar, LLP

(57) ABSTRACT

An obstacle determining apparatus includes a distance measuring device, and an obstacle determining portion which determines presence/absence of an obstacle in a measurement space region in front of the distance measuring device. The measurement space region is defined so that a position of a bottom surface of the measurement space region changes stepwisely or continuously according to a depth in a forward direction and/or a width direction of the measurement space region, for example, like a measurement space region D1. The measurement space region may be changed so that the position of the bottom surface of the measurement space region changes stepwisely or continuously according to a detection result of an inclination detecting portion.

21 Claims, 17 Drawing Sheets

(51) Int. Cl.
*G01S 17/93* (2006.01)
*G01S 17/10* (2006.01)
*G01S 17/36* (2006.01)

(56) References Cited

U.S. PATENT DOCUMENTS

2015/0151741 A1* 6/2015 Taira .................... G05D 1/0242
 701/23
2016/0280036 A1* 9/2016 Ishikawa .............. G05D 1/0236

* cited by examiner

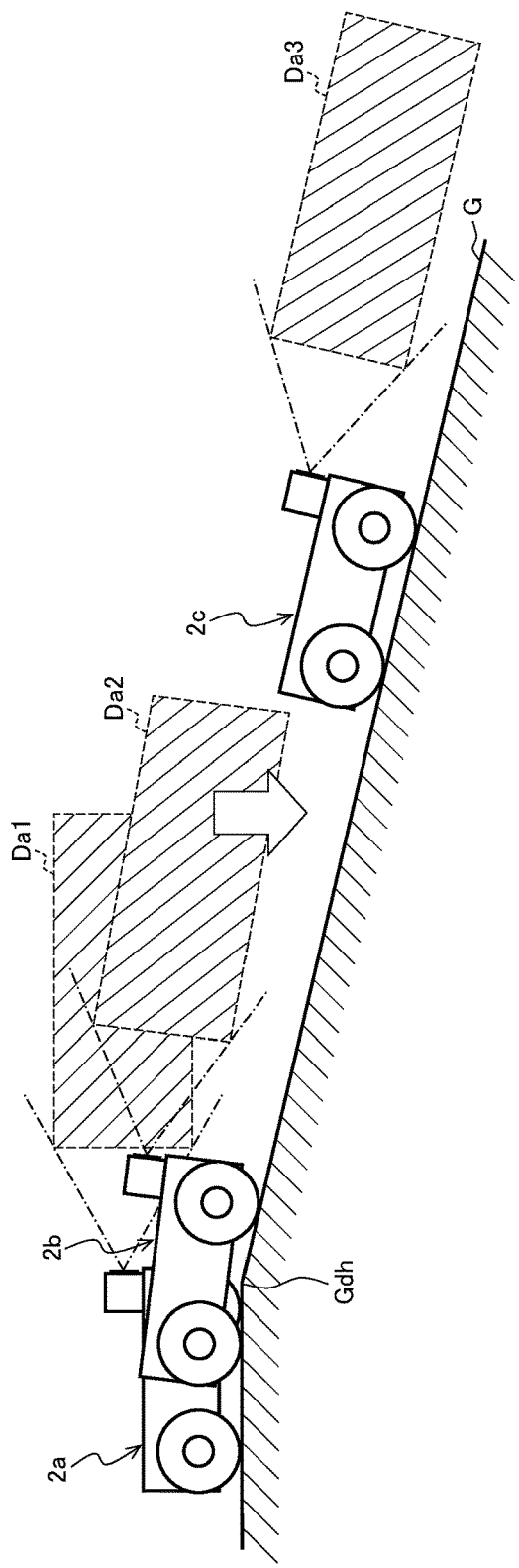

OBSTACLE DETERMINING APPARATUS, MOVING BODY, AND OBSTACLE DETERMINING METHOD

CROSS-NOTING PARAGRAPH

This non-provisional application claims priorities under 35 U.S.C. § 119(a) on Patent Applications No. 2015-147358 filed in JAPAN on Jul. 27, 2015 and No. 2015-185415 filed in JAPAN on Sep. 18, 2015, the entire contents of which are hereby incorporated herein by reference.

FIELD OF THE INVENTION

The present invention relates to an obstacle determining apparatus, a moving body, and an obstacle determining method.

BACKGROUND OF THE INVENTION

An autonomous traveling apparatus (also referred to as an automatic traveling apparatus) that determines its own operation by using sensor information and acts autonomously has been developed. For example, an optical distance measuring device (distance measuring sensor) is able to measure a distance to an object present in a measurement range and obtain a one-dimensional or two-dimensional distance data map, and is thus used as a safety device which is used for the autonomous traveling apparatus to detect and avoid an obstacle.

As to a configuration for detecting an obstacle by a moving body like the autonomous traveling apparatus, for example, Japanese Laid-Open Patent Publication No. 2013-254474 discloses an obstacle detecting apparatus including a depth sensor, a depression angle estimating portion which estimates a depression angle of the depth sensor based on a distance image obtained from the depth sensor, and a detecting portion which detects an obstacle present on a road surface based on the depression angle, a height of the depth sensor, and a distance of the distance image. Even when the depression angle varies due to shaking of the depth sensor during traveling of a moving body, the obstacle detecting apparatus is able to detect the obstacle on the road surface on which the moving body travels.

Moreover, Japanese Laid-Open Patent Publication No. 2015-106254 discloses an autonomous moving body aiming to accurately detect a level difference even in a state where the autonomous moving body is inclined. This autonomous moving body includes a driving unit, a plurality of distance measuring units installed so as to face a road surface and configured to measure a distance to the road surface, a control unit configured to compare the distance measured by the distance measuring units with a threshold and to control the driving unit, an inclination angle detecting unit configured to detect an inclination angle of a main body of the moving body, and a correction unit configured to correct at least one of the distance measured by each distance measuring unit and the threshold depending on the inclination angle of the main body of the moving body detected by the inclination angle detecting unit.

With a configuration in which an obstacle is detected by using a distance measuring device, it is possible to measure a distance to an object by the distance measuring device, but when a ground is included in a measurement range (measurement space region) by the distance measuring device, it is difficult to detect the ground and an obstacle to be detected while distinguishing them.

Even when setting is performed so that the measurement space region does not include the ground in order to solve such a problem, the ground appears in the measurement space region when a vehicle body and the distance measuring device shake or at a position where concave and convex exist on the ground or inclination of the ground changes, resulting that it is difficult to detect the ground and the obstacle to be detected while distinguishing them. Such a moving body including an obstacle determining apparatus detects the ground as an obstacle even when there is no object to be an obstacle for traveling and needs to perform control to stop or slow down for safety, so that usability is lowered.

Moreover, in order to detect the ground and the obstacle while distinguishing them when setting is performed so that the measurement space region includes the ground, it is necessary to discriminate whether a measurement point is the ground, for example, based on a relative angle between the distance measuring device and the ground and a measured distance. However, even with such a method, the relative angle between the distance measuring device and the ground varies when the vehicle body and the distance measuring device shake or at a position where inclination of the ground changes, so that it is difficult to perform accurate discrimination.

As a configuration for detecting the ground and the obstacle while distinguishing them, it is considered to apply data processing to output data of the distance measuring device and correctly recognize the ground as an object different from the obstacle. In this case, however, load of the data processing increases. Further, when shaking due to an impact or a change in the inclination of the ground is corrected by the data processing, algorithm becomes more complicated and the load of the data processing further increases. Thus, a high-performance and high-cost processing system is required to perform the data processing with a large load.

With a technique described in Japanese Laid-Open Patent Publication No. 2013-254474, in order to detect the obstacle on the road surface even when the depression angle at which the depth sensor shakes varies while the moving body travels, the relative angle between the ground and the sensor is estimated by data processing, whereas considerable arithmetic processing needs to be performed based on complicated algorithm for the estimation and a high-performance processing device is needed.

A technique described in Japanese Laid-Open Patent Publication No. 2015-106254 is a technique by which the distance to the road surface is measured to detect concave and convex on the ground by the distance measuring unit, but an obstacle such as another moving body that is in front of the moving body is difficult to be detected.

SUMMARY OF THE INVENTION

The invention has been made in view of such circumstances, and an object thereof is to prevent, even when shaking due to an impact is generated or when there is concave and convex of a ground or a change in inclination of the ground, the ground from being erroneously determined as an obstacle, with a simple configuration and simple algorithm in an obstacle determining apparatus including a distance measuring device.

In order to solve the aforementioned problems, first technical means of the invention is an obstacle determining apparatus including a distance measuring device which measures a distance to a measurement object, and an obstacle determining portion which determines presence/absence of an obstacle in a measurement space region in front of the distance measuring device based on a measurement result of the distance by the distance measuring device, in which the measurement space region is defined so that a position of a bottom surface of the measurement space region changes stepwisely or continuously according to a depth in a forward direction and/or a width direction of the measurement space region.

According to second technical means, in the first technical means, the measurement space region is defined so that a position of an upper surface of the measurement space region has a constant height regardless of the depth.

According to third technical means, in the first technical means, only when detecting the obstacle of a predetermined shape that includes at least a part of the bottom surface of the measurement space region defined in advance and indicates a ground, the obstacle determining portion changes definition of the measurement space region so that the position of the bottom surface becomes higher stepwisely or continuously.

According to fourth technical means, in the first technical means, the measurement space region is defined so that a position of an upper surface of the measurement space region becomes higher stepwisely or continuously as the depth increases.

According to fifth technical means, in the fourth technical means, only when detecting the obstacle of a predetermined shape that includes at least a part of the bottom surface of the measurement space region defined in advance and indicates a ground, the obstacle determining portion changes definition of the measurement space region so that the positions of the bottom surface and the upper surface become higher stepwisely or continuously.

According to sixth technical means, in the first technical means, an inclination detecting portion which detects inclination of the distance measuring device is further included, in which when a detection result of the inclination detecting portion indicates that the inclination of the distance measuring device is changed to a pitch direction and/or a roll direction, the measurement space region is changed so that the position of the bottom surface of the measurement space region changes stepwisely or continuously according to the depth in the forward direction and/or the width direction of the measurement space region.

According to seventh technical means, in the sixth technical means, when it is indicated that the inclination of the distance measuring device has no change to a direction causing the change of the position of the bottom surface, the measurement space region is changed so that the change of the position of the bottom surface according to the depth in the forward direction and/or the width direction of the measurement space region is returned to an original state.

According to eighth technical means, in the sixth technical means, when the detection result of the inclination detecting portion indicates that the inclination of the distance measuring device is changed to a forward inclination direction, the measurement space region is changed so that the position of the bottom surface becomes higher stepwisely or continuously according to the depth in the forward direction of the measurement space region.

According to ninth technical means, in the sixth technical means, when the detection result of the inclination detecting portion indicates that the inclination of the distance measuring device is changed to a backward inclination direction, the measurement space region is changed so that the position of the bottom surface becomes lower stepwisely or continuously according to the depth in the forward direction of the measurement space region.

According to tenth technical means, in the sixth technical means, when the detection result of the inclination detecting portion indicates that the inclination of the distance measuring device is changed to a forward inclination direction, the measurement space region is changed so that the position of the bottom surface becomes lower stepwisely or continuously according to the depth in the forward direction of the measurement space region.

According to eleventh technical means, in the seventh technical means, when the detection result of the inclination detecting portion indicates that the inclination of the distance measuring device is changed to a forward inclination direction, the position of the bottom surface of the measurement space region is maintained for a fixed time period.

According to twelfth technical means, in the sixth technical means, when the detection result of the inclination detecting portion indicates that the inclination of the distance measuring device is changed to a backward inclination direction, the measurement space region is changed so that the position of the bottom surface becomes higher stepwisely or continuously according to the depth in the forward direction of the measurement space region.

According to thirteenth technical means, in the seventh technical means, when the detection result of the inclination detecting portion indicates that the inclination of the distance measuring device is changed to a backward inclination direction, the position of the bottom surface of the measurement space region is maintained for a fixed time period.

According to fourteenth technical means, in the sixth technical means, when the detection result of the inclination detecting portion indicates that the inclination of the distance measuring device is changed to a left roll direction or a right roll direction, the measurement space region is changed so that the position of the bottom surface of the measurement space region becomes higher stepwisely or continuously according to a depth in a left direction or a right direction of the measurement space region.

According to fifteenth technical means, in the sixth technical means, as a degree of the change of the inclination indicated by the detection result of the inclination detecting portion is greater, a degree of changing the position of the bottom surface stepwisely or continuously is set to be great.

According to sixteenth technical means, in the first technical means, a position detecting device which detects a position of the distance measuring device and a map information holding portion are further included, in which the measurement space region is changed so that the position of the bottom surface of the measurement space region changes stepwisely or continuously according to the depth in the forward direction and/or the width direction of the measurement space region based on current position information of the distance measuring device.

Seventeenth technical means is a moving body including the obstacle determining apparatus according to the first technical means, a driving portion, and a drive control portion which controls the driving portion, in which the measurement space region has a first region provided in at least an upper part on a near side in the measurement space region and a second region which is another region, and the drive control portion controls the driving portion to stop the moving body when it is determined that there is an obstacle in the first region, and controls the driving portion to slow down the moving body when it is determined that there is an obstacle in the second region.

Eighteenth technical means is a moving body including the obstacle determining apparatus according to the sixth technical means, a driving portion, and a drive control portion which controls the driving portion, in which the measurement space region has a first region provided in at least an upper part on a near side in the measurement space region and a second region which is another region, and the drive control portion controls the driving portion to stop the moving body when it is determined that there is an obstacle in the first region, and controls the driving portion to slow down the moving body when it is determined that there is an obstacle in the second region.

Nineteenth technical means is an obstacle determining method having an obstacle determining step of determining presence/absence of an obstacle in a measurement space region in front of a distance measuring device which measures a distance to a measurement object, based on a measurement result of the distance from the distance measuring device, in which the measurement space region is defined so that a position of a bottom surface of the measurement space region changes stepwisely or continuously according to a depth in a forward direction and/or a width direction of the measurement space region.

According to twentieth technical means, in the nineteenth technical means, an inclination detecting step of detecting inclination of the distance measuring device is further included, in which when a detection result at the inclination detecting step indicates that the inclination of the distance measuring device is changed to a forward inclination direction and/or a roll direction, the measurement space region is changed so that the position of the bottom surface of the measurement space region changes stepwisely or continuously according to the depth in the forward direction and/or the width direction of the measurement space region.

Advantageous Effects of Invention

According to the invention, in an obstacle determining apparatus including a distance measuring device, without a complicated configuration or algorithm, simple algorithm makes it possible to prevent a ground from being erroneously detected as an obstacle even when shaking due to an impact is generated or when there is concave and convex of the ground or a change in inclination of the ground, by defining or changing a measurement space region in front of the distance measuring device so that the ground is difficult to be detected.

BRIEF DESCRIPTION OF THE DRAWINGS

FIG. 13A is a schematic view illustrating an example in which the measurement space region of FIG. 10 changes due to entering a downhill and returns to its original state in a moving body provided with an obstacle determining apparatus according to a ninth embodiment of the invention;

PREFERRED EMBODIMENTS OF THE INVENTION

An obstacle determining apparatus according to an embodiment of the invention is an apparatus which determines an obstacle by using a distance measuring device and is configured to prevent a ground from being erroneously detected as an obstacle. This obstacle determining apparatus is mainly installed in a moving body. Examples of this moving body include a moving body which moves in facilities such as factories or public facilities or in sites of the facilities, parking areas, or the like, and a moving body such as an automobile or a motorcycle traveling on a public road. In particular, as a moving body which automatically moves in sites or facilities, there is a so-called an autonomous traveling apparatus which is an autonomous traveling type and has a control mechanism. A moving body, such as an automobile, which is basically driven by a driver is also able to travel autonomously or travel autonomously as driving assistance for the driver by installing autonomous traveling control. A moving body provided with the obstacle determining apparatus is able to be used not only for a transportation purpose for transporting persons and articles but also for monitoring surroundings while moving, and in such a case, the moving body may be called a monitoring robot.

Hereinafter, various embodiments of the invention will be described with reference to drawings. Note that, in the description below, like numerals represent like elements even in configurations of various drawings, so that description thereof will be omitted.

(First Embodiment)

Figure 1:
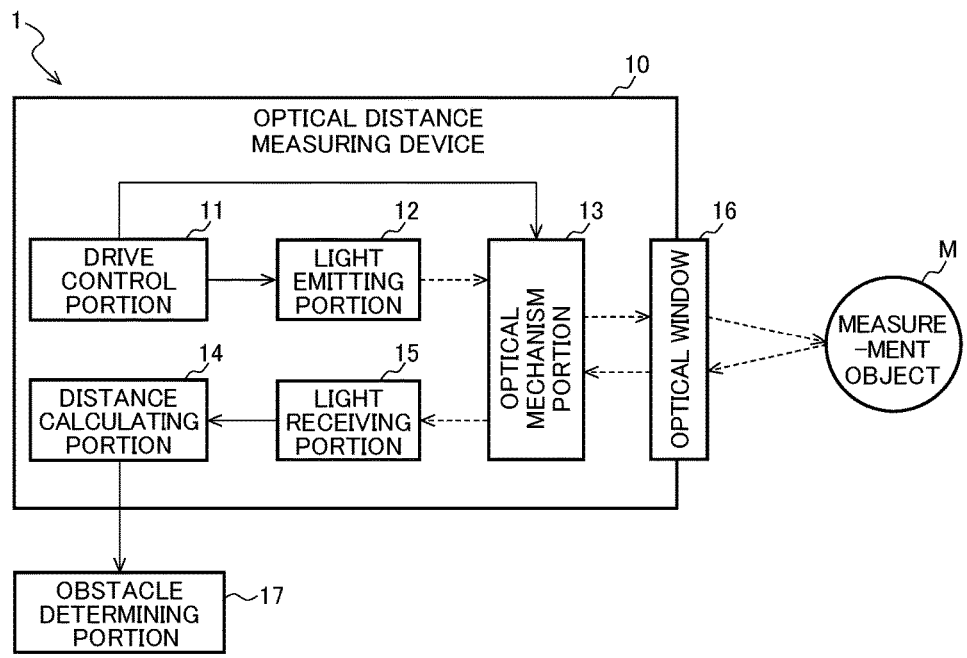
FIG. 1 is a block diagram illustrating one configuration example of an obstacle determining apparatus according to a first embodiment of the invention.
Figure 2:
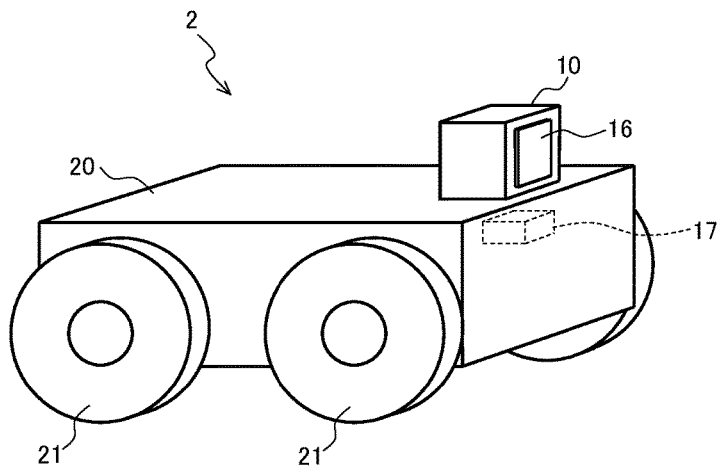
FIG. 2 is an external view illustrating one configuration example of a moving body including the obstacle determining apparatus of FIG. 1.

A first embodiment of the invention will be described with reference to FIG. 1 to FIG. 4C. FIG. 1 is a block diagram illustrating one configuration example of an obstacle determining apparatus according the present embodiment. FIG. 2 is an external view illustrating one configuration example of a moving body including the obstacle determining apparatus of FIG. 1.

As exemplified in FIG. 1, an obstacle determining apparatus 1 according to the present embodiment includes an optical distance measuring device (hereinafter, simply referred to as a distance measuring device) 10 which measures a distance to a measurement object M by an optical measuring mechanism, and an obstacle determining portion 17.

Specifically, the distance measuring device 10 modulates measurement light output from a laser light source, radiates the resultant to the object through an optical window, and detects reflection light from the measurement object M by a light receiving element through the optical window to measure the distance. As a scheme for modulating the measuring light, an AM (Amplitude Modify) scheme and a TOF (Time of Flight) scheme are put into use and the distance measuring device 10 may adopt any of the schemes. In the AM scheme, measurement light that is AM-modulated by a sine wave and reflection light thereof are subjected to photoelectric conversion, a phase difference between signals thereof is calculated, and a distance is computed from the phase difference. The TOF scheme is a scheme in which measurement light that is modulated into a pulse form and reflection light thereof are subjected to photoelectric conversion, and a distance is computed from a delay time between signals thereof.

The distance measuring device 10 two-dimensionally scans the measurement light in vertical and horizontal directions and receives reflection light to thereby measure the distance to the measurement object M in a fixed measurement space region (measurement range). That is, the distance measuring device 10 can be also said as an area sensor in this measurement range. Representative examples of such a distance measuring device 10 include 3D-LIDAR (Light Detection and Ranging or Laser Imaging Detection and Ranging), laser range finder, and the like. When a measurement direction may be limited, 2D-LIDAR that is installed so as to perform scanning in a vertical direction (/horizontal direction) is also able to be adopted. In this case, by arranging the 2D-LIDAR at a predetermined interval in the horizontal direction (/vertical direction), the measurement space region as described above is able to be covered. Note that, the laser range finder is a distance measuring sensor adopting the TOF scheme and is able to perform measurement of a two-dimensional plane and three-dimensional measurement by having one scanning axis and two scanning axes, respectively. The LIDAR can be also said as one type of the laser range finder.

In addition, by radiating light, such as infrared light, from a light emitting portion without scanning light and using a two-dimensional light receiving sensor for the light receiving element, it is also possible to measure the distance to the object in the fixed measurement space region based on a light reception result of the two-dimensional light receiving sensor. Examples of the two-dimensional light receiving sensor include a CCD (Charge Coupled Device) and a CMOS (Complementary Metal Oxide Semiconductor Image Sensor). An example of such a distance measuring device includes a TOF camera which causes a near infrared LED (Light Emitting Diode) to emit light in pulses and reads an arrival time of reflection light by a CCD to obtain a three-dimensional measurement point image.

The distance measuring device 10 having the present exemplary configuration has a light emitting portion 12 which emits measurement light, a light receiving portion 15 which receives reflection light of the measurement light emitted from the light emitting portion 12, an optical mechanism portion 13 including an optical path adjusting portion, such as a mirror, which performs drive-scanning of an optical path of the emitted measurement light and guides reflection light to the light receiving portion 15, an optical window 16 which transmits the measurement light emitted from the light emitting portion 12 and reflection light thereof, a drive control portion 11 which performs control of light emission driving of the light emitting portion 12 and driving of the optical path adjusting portion, and a distance calculating portion 14 which calculates the distance to the measurement object M based on an output signal subjected to photoelectric conversion by the light receiving portion 15 and optical path driving information from the drive control portion 11 and outputs the distance as a measurement result of distance information.

The obstacle determining portion 17 determines presence/absence of an obstacle in the measurement space region in front of the distance measuring device 10 based on the measurement result of the distance by the distance measuring device 10. When determining that there is an object (an object to be recognized as an obstacle) in the measurement space region in front of the obstacle determining apparatus 1, the obstacle determining portion 17 determines the object as an obstacle. The measurement space region is basically defined as a predetermined region as a so-called measurement area (obstacle detection area) and can be said to be a region indicating a coordinate space of a measurement object point (measurement point). Note that, a resolution (measurement accuracy) of the measurement space region is not particularly limited, and accuracy of a distance and a direction that are able to be measured is just enhanced when the resolution is preferable. This measurement space region is a main characteristic of the present embodiment and will be described below.

An obstacle determining method of the obstacle determining portion 17 is not limited. For example, rectangular coordinates (a coordinate in at least one direction is defined as a distance) of respective measurement points to the measurement object M (not infinite but limited) whose distance is measured by the distance measuring device 10 are obtained. When there are coordinates in the measurement space region among the obtained coordinates, it may be determined that there is an obstacle. It is preferable that it is determined that there is an obstacle only when the predetermined number of measurement points that are measured exist in the measurement space region.

As illustrated in FIG. 2, the obstacle determining apparatus 1 as described above is mounted in a moving body 2, such as an autonomous traveling apparatus, which automatically travels by avoiding collision with an obstacle while detecting the obstacle. In this example, the distance measuring device 10 is attached to a main body 20 and a unit constituting the obstacle determining portion 17 is mounted inside the main body 20.

The exemplified moving body 2 has four wheels 21 attached to the main body 20, and is provided with a driving portion which makes the moving body 2 travel and a drive control portion (referred to as a wheel drive control portion for discrimination) which performs control thereof, which are not illustrated. The drive control portion is constituted by, for example, a motor and/or engine, etc. for rotationally driving the plurality of wheels 21. Of course, without limitation to the exemplified wheels 21, for example, a crawler or the like may be driven.

The wheel drive control portion controls the driving portion so as to perform an operation for avoiding collision with the obstacle based on the determination result by the obstacle determining portion 17. In this case, when the obstacle determining portion 17 determines that an object is in the measurement space region, information thereof is output to the wheel drive control portion. Then, the wheel control driving portion performs control, for example, to cause the moving body 2 which is traveling to change a traveling direction, slow down, or stop just in front of the obstacle. Based on this control, it is possible to cause the driving portion to perform an operation such as changing of the traveling direction, slowing down, or stopping, thus making it possible to avoid collision with the obstacle.

In addition, when the moving body 2 is provided with a storage portion storing map information, a position information obtaining portion, and the like, the moving body 2 is able to move along an expected route. An example of the position information obtaining portion includes a unit which obtains a position of the moving body 2 by using a satellite positioning system including GPS (Global Positioning System), GNSS (Global Navigation Satellite System) such as GLONASS (Global Navigation Satellite System) of Russia, Galileo of EU, and BeiDou of China as well as Quasi-Zenith Satellite System (QZSS) of Japan and IRNSS (Indian Regional Navigational Satellite System) of India.

Figure 3A:
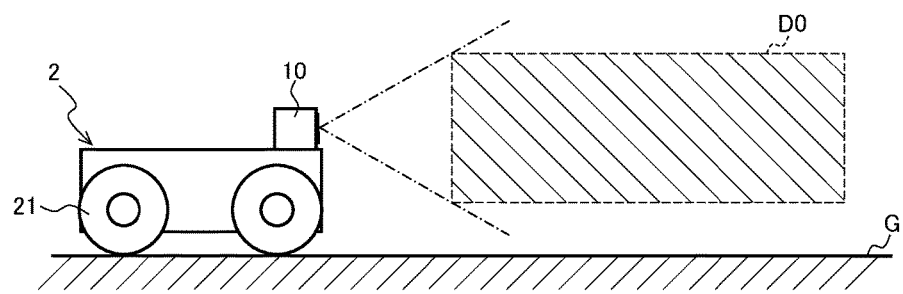
FIG. 3A is a cross-sectional view taken along an advancing direction for illustrating an example of a conventional measurement space region of the moving body provided with the obstacle determining apparatus.
Figure 3B:
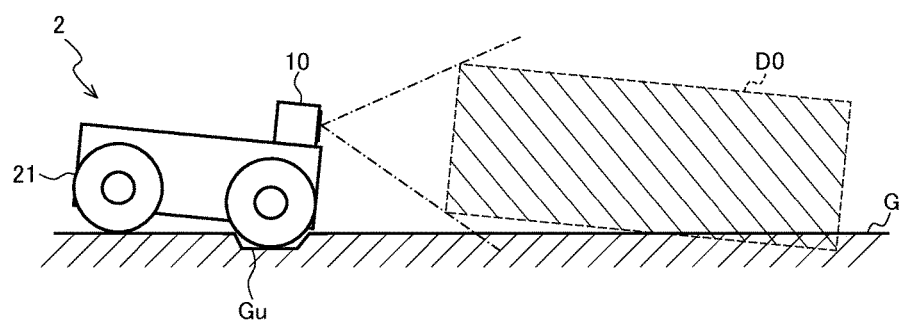
FIG. 3B is a schematic view illustrating an example in which the measurement space region of FIG. 3A changes due to a topographic change.
Figure 3C:
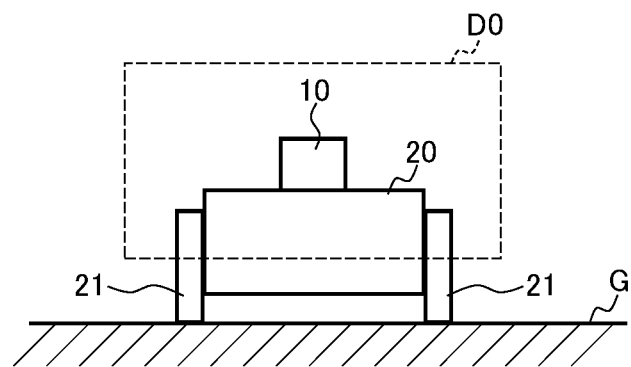
FIG. 3C is a cross-sectional view of a plane of the measurement space region of FIG. 3A, which is vertical to the advancing direction.
Figure 3D:
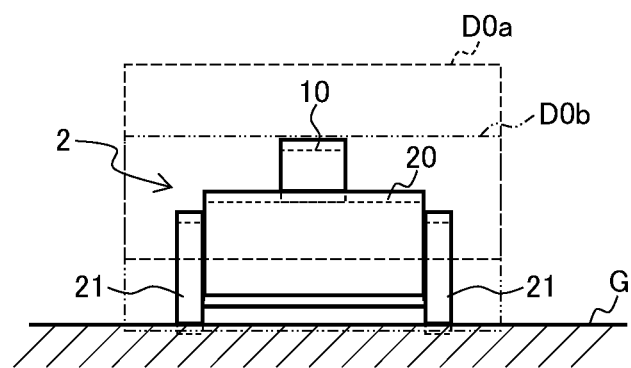
FIG. 3D is a cross-sectional view of a plane of the measurement space region of FIG. 3B, which is vertical to the advancing direction.

Next, the main characteristic of the present embodiment will be described with reference to FIG. 3A to FIG. 4C together. FIG. 3A is a cross-sectional view taken along an advancing direction for illustrating an example of a conventional measurement space region of a moving body provided with an obstacle determining apparatus, FIG. 3B is a schematic view illustrating an example in which the measurement space region of FIG. 3A changes due to a topographic change, FIG. 3C is a cross-sectional view of a plane of the measurement space region of FIG. 3A, which is vertical to the advancing direction, and FIG. 3D is a cross-sectional view of a plane of the measurement space region of FIG. 3B, which is vertical to the advancing direction. Note that, though each of FIG. 3A to FIG. 3D illustrates the conventional measurement space region, description will be given by assigning numerals 10 and 2 to a distance measuring device in the obstacle determining apparatus and a moving body provided with the obstacle determining apparatus, respectively, for convenience of a sixth embodiment described below.

Figure 4A:
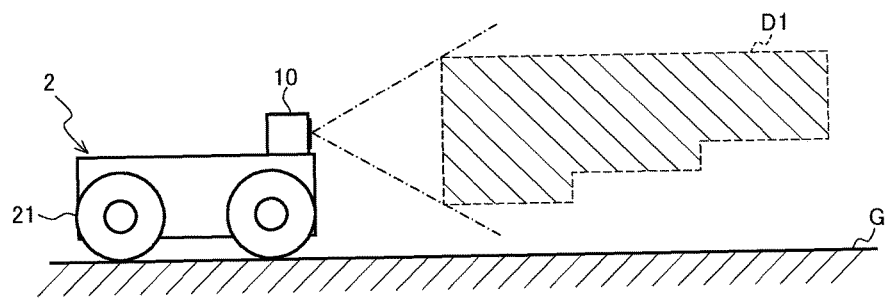
FIG. 4A is a cross-sectional view taken along an advancing direction for illustrating an example of a measurement space region of the moving body provided with the obstacle determining apparatus of FIG. 1.
Figure 4B:
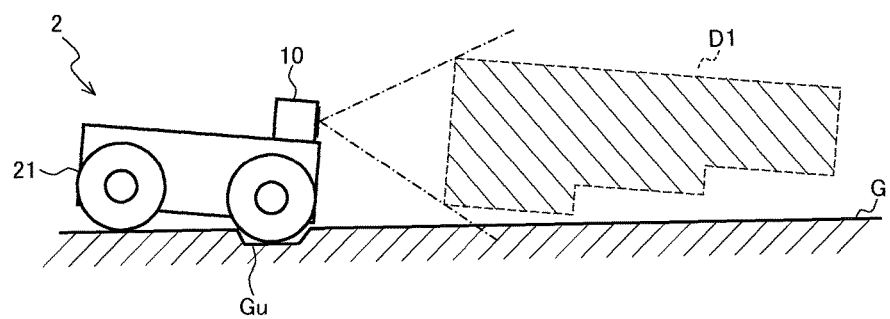
FIG. 4B is a schematic view illustrating an example in which the measurement space region of FIG. 4A changes due to a topographic change.
Figure 4C:
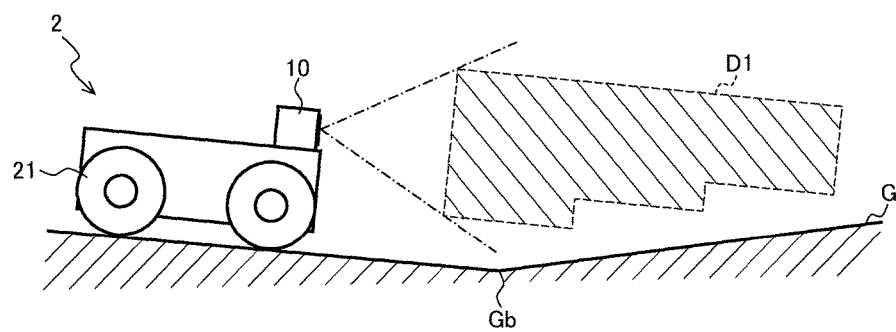
FIG. 4C is a schematic view illustrating another example in which the measurement space region of FIG. 4A changes due to a topographic change.

FIG. 4A is a cross-sectional view taken along an advancing direction for illustrating an example of a measurement space region of the moving body 2 provided with the obstacle determining apparatus 1 of FIG. 1, FIG. 4B is a schematic view illustrating an example in which the measurement space region of FIG. 4A changes due to a topographic change, and FIG. 4C is a schematic view illustrating another example in which the measurement space region of FIG. 4A changes due to a topographic change.

As the main characteristic of the present embodiment, the measurement space region is defined so that a position of a bottom surface of the measurement space region changes stepwisely or continuously according to a depth in a forward direction of the measurement space region (that is, as the depth increases). In the present embodiment, this definition is basically applied in advance.

The depth in the forward direction basically refers to a distance from the optical window 16 to the forward direction, but may be a value, for example, obtained by adding, to the distance, a distance of an optical path from the optical mechanism portion 13 or the light emitting portion 12 to the optical window 16. When the moving body 2 is placed on a horizontal ground and when the optical window 16 of the distance measuring device 10 is disposed within a plane vertical to the ground and an advancing direction of the moving body 2 (hereinafter, referred to as model arrangement for convenience), the position of the bottom surface means, for example, a height of a bottom edge of the measurement space region from the ground. That is, in the case of the model arrangement, the position of the bottom surface means an offset amount of the measurement space region from the ground. Moreover, for making the region to be laterally equal, the measurement space region and also the height of the bottom surface are basically set to be bilaterally symmetric with respect to a central axis vertical to a surface of the optical window 16.

Description will be given with a specific example. A measurement space region D0 illustrated in FIG. 3A and FIG. 3C is a rectangular parallelepiped region defined within a region that is able to be measured by the distance measuring device 10, and an upper surface and a bottom surface of the measurement space region D0 in the model arrangement are parallel to a ground G in cross section. Note that, a measurement limit distance is set to the distance measuring device 10, and the distance measuring device 10 is not able to accurately measure a distance to an object at a position further than the measurement limit distance, so that magnitude of the depth (deepness) is limited as in the measurement space region D0. It is possible to determine the measurement limit distance in a near side according to an advancing speed, a turning diameter, or the like of the moving body 2. There is no trouble even when an obstacle exists at a position nearer than the distance because the obstacle has already been detected at a position further than the distance.

Even the exemplified measurement space region D0 has no trouble because the model arrangement is achieved as long as the ground G is flat. However, the ground G normally has a level difference or concave and convex on an unpaved road. As exemplified in FIG. 3B and FIG. 3D, when there is a depression (concave) Gu on the ground G and front wheels 21 fall in the depression Gu, a vehicle body and the distance measuring device 10 of the moving body 2 are inclined frontward. Thus, though there is no trouble in a back portion D0a (side closer to the distance measuring device 10) of the measurement space region D0, a front portion D0b (side further from the distance measuring device 10) overlaps the ground G and the distance measuring device 10 detects the ground G as a measurement object (that is, an obstacle). When the ground G is detected as the obstacle, an avoiding operation such as stopping is to be performed for safety even in a scene where there is nothing to be an obstacle for traveling, so that usability is lowered.

The cause of such erroneous detection lies in that when the vehicle body and the distance measuring device 10 of the moving body 2 are inclined forward, a measurement region at a position away from the distance measuring device 10 (in a depth direction) is more greatly shifted in a direction of the ground G. This point is focused on in the present embodiment and countermeasure is taken to prevent the ground G from being erroneously detected in the measurement space region when the vehicle body is inclined forward by considering the height of the measurement space region D0 by the vehicle body after being inclined forward from the ground G.

That is, in the present embodiment, for example, a measurement space region D1 illustrated in FIG. 4A is defined and used as a measurement space region. The measurement space region D1 is also a region defined within a region that is able to be measured by the distance measuring device 10 and is a region defined so that a position of a bottom surface thereof becomes higher (the bottom surface is floated) stepwisely, that is, changes as the depth increases in the measurement space region D0 (as a vertical distance from the optical window 16 is longer). When the position is made higher stepwisely, a degree of making the position higher according to the depth may be at a constant rate as exemplified in the measurement space region D1 (that is, the position may be made higher in proportion to the depth), but may not be at a constant rate. Though not illustrated, the measurement space region D1 may be defined so that the position becomes higher not stepwisely but continuously (in a smooth slope shape) as the depth increases.

By adopting such a measurement space region D1, it is possible to prevent a front portion of the measurement space region D1 from overlapping the ground G as exemplified in FIG. 4B even when the depression Gu is on the ground G and the wheels 21 fall in the depression Gu similarly to the example of FIG. 3B or even when a similar state is generated due to shaking of the moving body 2. That is, it is possible to prevent the distance measuring device 10 from detecting the ground G as a measurement object (that is, an obstacle).

Without limitation to the depression Gu, also in a case where there is a change in inclination of the ground G (a change in which an angle of the ground G before and after the change is less than 180° as illustrated) as exemplified with an example in which inclination of the ground G changes at a changing position Gb in FIG. 4C, the ground G is detected when the measurement space region D0 is adopted, whereas such detection is able to be prevented when the measurement space region D1 is adopted.

The measurement space region in the present embodiment is defined so that a position of an upper surface of the measurement space region is at a constant height regardless of the depth (regardless of a distance to a measurement object) as exemplified in FIG. 4A to FIG. 4C, but is not limited thereto. Note that, the constant height means that the height from the ground at the time of the model arrangement is constant.

Description has been given by assuming that the measurement space region (the measurement space region D0 in the examples of FIG. 3A to FIG. 4C) before positions of the bottom surface and the upper surface are adjusted has a rectangular parallelepiped, but there is no limitation thereto. As the measurement space region before the adjustment, for example, a measurement space region in which, in a group of measurement points radially provided frontward with a light emission point of the optical window 16 as a center, a lower limit and an upper limit of the depth in the forward direction are provided and width and height directions are limited to be within a rectangular region radially extends with a central axis which passes through the center and is vertical to the optical window 16 as a center may be adopted.

According to the present embodiment, the measurement space region in front of the distance measuring device 10 is defined so that the ground is difficult to be detected. Thus, in the present embodiment, without a complicated configuration or algorithm, simple algorithm makes it possible to prevent the ground from being erroneously determined as an obstacle even when shaking due to an impact or a change in inclination of the ground is caused. In the present embodiment, when the measurement space region is narrowed, the measurement space region becomes narrower as being further from the distance measuring device 10, so that it can be said that there is substantially small influence on collision avoiding processing. For example, when a low object is on a flat ground, the object is not able to be detected at a position away from the distance measuring device 10 but is able to be detected when being closer, so that it is possible to avoid collision with the object.

Though the optical distance measuring device has been taken above as an example of the distance measuring device, not only laser light, infrared light, visible light, or the like but also ultrasonic waves, electromagnetic waves, or the like may be adopted to be radiated for sensing and this is also applied to embodiments described below. That is, the obstacle determining apparatus is able to include a distance measuring device which measures a distance by radiating ultrasonic waves, electromagnetic waves, or the like, instead of the optical distance measuring device. In particular, by adopting contrivance such as providing of directivity, presence or absence of an object at each measurement point is able to be sensed also by ultrasonic waves or the like. However, a laser is preferably used because of having excellent weather resistance and high measurement accuracy.

(Second Embodiment)

Figure 5A:
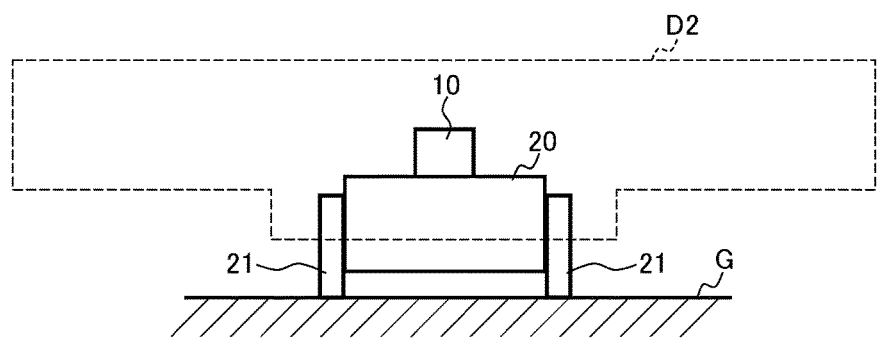
FIG. 5A is a cross-sectional view of a plane vertical to an advancing direction for illustrating an example of a measurement space region of a moving body provided with an obstacle determining apparatus according to a second embodiment of the invention.
Figure 5B:
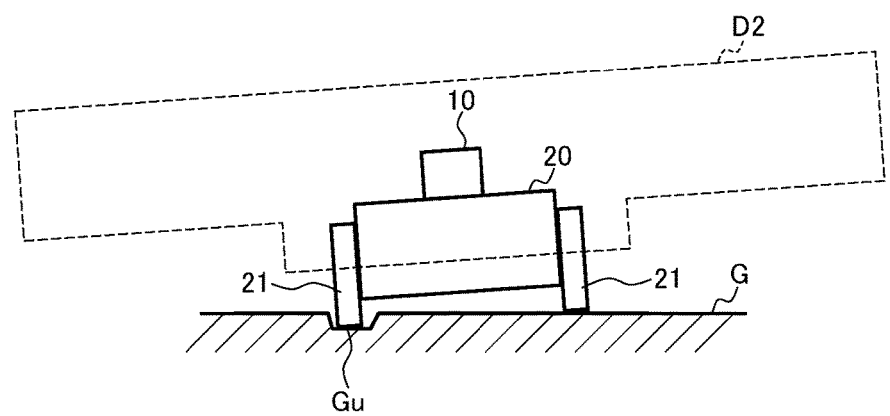
FIG. 5B is a schematic view illustrating an example in which the measurement space region of FIG. 5A changes due to a topographic change.

A second embodiment of the invention will be described with reference to FIG. 5A and FIG. 5B. FIG. 5A is a cross-sectional view of a plane vertical to an advancing direction for illustrating an example of a measurement space region of a moving body provided with an obstacle determining apparatus according to the second embodiment of the invention, and FIG. 5B is a schematic view illustrating an example in which the measurement space region of FIG. 5A changes due to a topographic change. Note that, in the present embodiment, though description for overlapping parts with the first embodiment will be basically omitted, various applications described in the first embodiment are able to be applied.

In the first embodiment, as exemplified with the measurement space region D1, a measurement space region is defined so that a position of a bottom surface thereof becomes higher stepwisely or continuously according to a depth in a forward direction thereof. On the other hand, in the present embodiment, a measurement space region is defined so that the position of the bottom surface of the measurement space region becomes higher stepwisely or continuously according to a depth in a width direction (depth in a lateral direction) of the measurement space region. One example of the measurement space region defined in such a manner is a measurement space region D2 illustrated in FIG. 5A.

As exemplified in FIG. 5B, for example, when there is a depression Gu on a ground G and a wheel 21 falls in the depression Gu or when the distance measuring device 10 laterally shakes due to vibration, the distance measuring device 10 is inclined in a lateral direction and the measurement space region D2 also laterally shakes.

However, it is possible in the present embodiment to prevent the ground G from being erroneously detected as an obstacle even when there is such shaking because the position of the bottom surface becomes higher stepwisely or continuously. In addition, the measurement space region is narrowed as being further from the distance measuring device, so that it is thought to be practical in the present embodiment.

As another example of the measurement space region in the present embodiment, a measurement space region which adopts the aforementioned radial region, in which a lower limit and an upper limit of the depth in the forward direction are provided and width and height directions at least on a bottom surface side are limited to be within a cylindrical region or an ellipse region with the central axis of the light emission point as a center, may be adopted.

In the present embodiment as well, the measurement space region is defined but not limited to have a position of an upper surface of the measurement space region at a constant height regardless of the depth (regardless of the depth in the lateral direction in the present embodiment) as exemplified in FIG. 5A. Note that, the constant height means that the height from the ground at the time of the model arrangement is constant.

(Third Embodiment)

Figure 6:
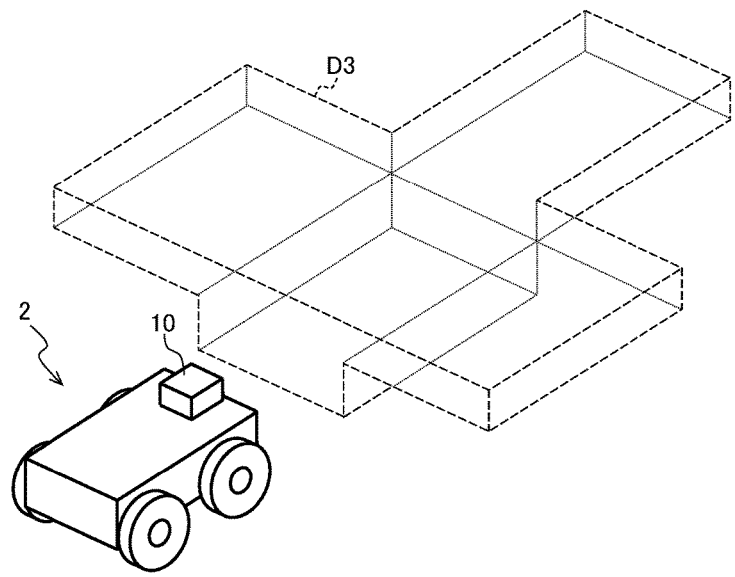
FIG. 6 is a perspective view illustrating an example of a measurement space region of a moving body provided with an obstacle determining apparatus according to a third embodiment of the invention.

As described above, applications of the first embodiment are able to be applied to the second embodiment. As a third embodiment of the invention, an embodiment to which both of the embodiments are applied will be described with reference to FIG. 6. FIG. 6 is a perspective view illustrating one example of a measurement space region of a moving body provided with an obstacle determining apparatus according to the present embodiment. Note that, in the present embodiment, though description for overlapping parts with the first and second embodiments will be basically omitted, various applications described in the first and second embodiments are able to be applied.

In the present embodiment, both of the first and second embodiments are applied and a measurement space region is defined so that a position of a bottom surface thereof becomes higher stepwisely or continuously according to a depth in a forward direction thereof and a depth in a lateral direction (width direction) thereof. One example of the measurement space region defined in such a manner is a measurement space region D3 illustrated in FIG. 6. With the present embodiment, it is possible to prevent a ground from being erroneously detected as an obstacle even when any of forward inclination and lateral inclination of the distance measuring device 10 is caused.

(Fourth Embodiment)

Figure 7A:
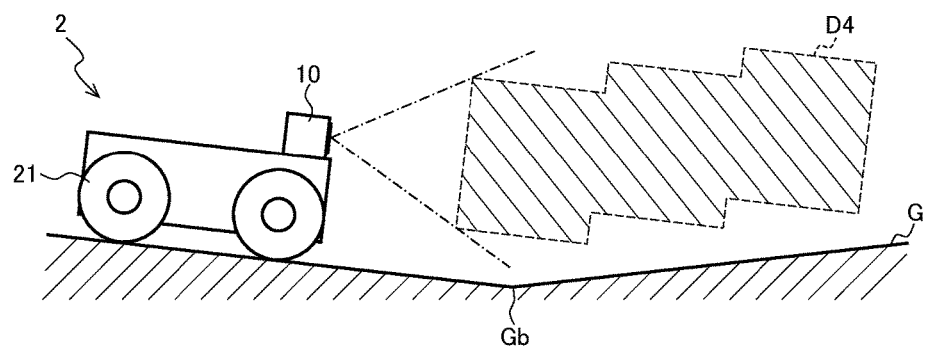
FIG. 7A is a cross-sectional view of a plane vertical to an advancing direction for illustrating an example of a measurement space region of a moving body provided with an obstacle determining apparatus according to a fourth embodiment of the invention.

A fourth embodiment of the invention will be described with reference to FIG. 7A. FIG. 7A is a cross-sectional view of a plane vertical to an advancing direction for illustrating an example of a measurement space region of a moving body provided with an obstacle determining apparatus according to the present embodiment. Note that, in the present embodiment, though description for overlapping parts with the first to third embodiments will be basically omitted, various applications described in the first to third embodiments are able to be applied.

A measurement space region in the present embodiment is defined so that a position of an upper surface of the measurement space region becomes higher stepwisely or continuously, that is, the measurement space region before adjustment as exemplified with the measurement space region D0 is shifted to be higher as the depth (depth in the forward direction and/or the width direction) increases. One example of the measurement space region defined in such a manner is a measurement space region D4 illustrated in FIG. 7A.

In the measurement space region D4, not only a position of a bottom surface thereof is made high but also the position of the upper surface thereof is made high accordingly in order to prevent the ground G from being erroneously detected as an obstacle, for example, when inclination of the ground G changes at a changing position Gb or when a wheel 21 falls in a depression or rides over a level difference. Thus, even in such a case, it is possible to detect an obstacle having certain extent of height from a remote position. Of course, a degree of the change of the height of the bottom surface position and a degree of the change of the height of the upper surface position may be different from each other and the same is able to be applied also to a depth in the width direction like in the second and third embodiments.

(Fifth Embodiment)

In a fifth embodiment of the invention, though description for overlapping parts with the first to fourth embodiments will be basically omitted, various applications described in the first to fourth embodiments are able to be applied.

Only when detecting an obstacle having a predetermined shape that includes at least a part of a bottom surface of a measurement space region defined in advance and indicates a ground, the obstacle determining portion 17 of the present embodiment changes (updates) the definition of the measurement space region so that the position of the bottom surface (and the upper surface) becomes higher stepwisely or continuously.

The measurement space region defined in advance is a measurement space region in which a position of a bottom surface (and the upper surface) is not changed, in other words, the bottom surface does not become higher according to the depth as exemplified with the measurement space region D0. The predetermined shape refers to, for example, a rectangular shape over a whole region in the width direction, which includes the bottom surface of the measurement space region D0, and the detection may be determined with any method.

That is, the obstacle determining portion 17 of the present embodiment defines, for example, the measurement space region D0 in advance, and only when detecting a ground (an obstacle of the predetermined shape that includes at least a part of the bottom surface of the measurement space region D0) based on the definition, changes the definition of the measurement space region to the measurement space region D1, D2, D3, D4, or the like.

With such control, the ground is simply detected first, and then, the measurement space region D1 or the like in which the ground is not erroneously detected is adopted, so that it is also possible to detect a low obstacle from a remote position before the ground is detected. That is, in the present embodiment, measurement is performed first with in a broad measurement range, and the measurement range is narrowed only when it is assumed that the measurement range needs to be narrowed. Further, the measurement range is narrowed so as to be narrower as being further from the distance measuring device, so that it is thought to be practical.

(Sixth Embodiment)

Figure 7B:
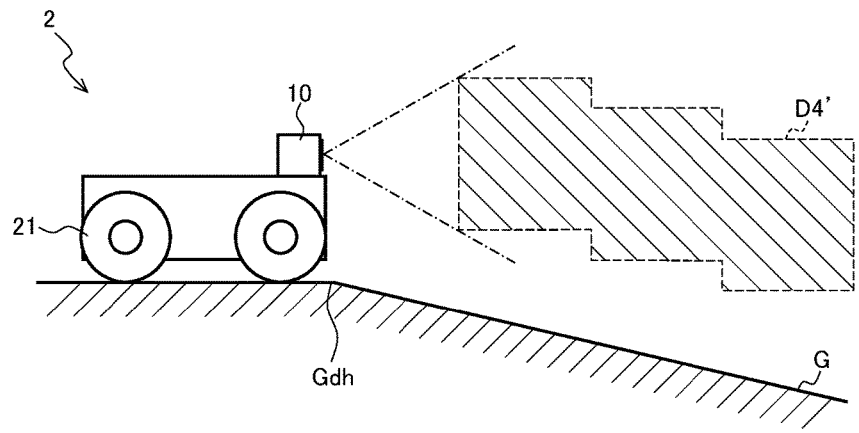
FIG. 7B is a cross-sectional view of a plane vertical to an advancing direction for illustrating an example of a measurement space region of a moving body provided with an obstacle determining apparatus according to a sixth embodiment of the invention.

A sixth embodiment of the invention will be described with reference to FIG. 7B. FIG. 7B is a cross-sectional view of a plane vertical to an advancing direction for illustrating an example of a measurement space region of a moving body provided with an obstacle determining apparatus according to the present embodiment. Illustrated is a scene where the moving body 2 travels on a flat road and then reaches a downhill with a constant gradient, a branch point of which is indicated with Gdh.

A measurement space region in the present embodiment is defined so that a position of a bottom surface of the measurement space region becomes lower stepwisely or continuously and a position of the bottom surface of the measurement space region becomes lower stepwisely or continuously as the depth (depth in a forward direction and/or a width direction) increases. One example of the measurement space region defined in such a manner is a measurement space region D4' illustrated in FIG. 7B.

When there is an obstacle at a position slightly down the downhill, it takes time to find the obstacle with the measurement space region in which the bottom surface is parallel to the ground G as exemplified with the measurement space region D0. Thus, when the moving body 2 reaches the downhill with the constant gradient, it is desirable that the position of the bottom surface of the measurement space region becomes lower stepwisely or continuously.

Therefore, in the present embodiment, in order to detect that the moving body 2 reaches the downhill with the constant gradient, the distance measuring device 10 has a position detecting device, such as a GPS, which detects a current position and a map information holding portion which holds map information. Thereby, it is possible to determine whether or not the moving body reaches the downhill based on the map information. Note that, it is also possible in the present embodiment to make the position of the bottom surface of the measurement space region higher stepwisely or continuously like in the measurement space region D4 illustrated in FIG. 7A when the moving body 2 reaches an uphill.

In this manner, the measurement space region in the present embodiment is defined so that the position of a bottom surface of the measurement space region changes stepwisely or continuously according to the depth in the forward direction and/or the width direction of the measurement space region based on position information of the distance measuring device.

(Seventh Embodiment)

Figure 8:
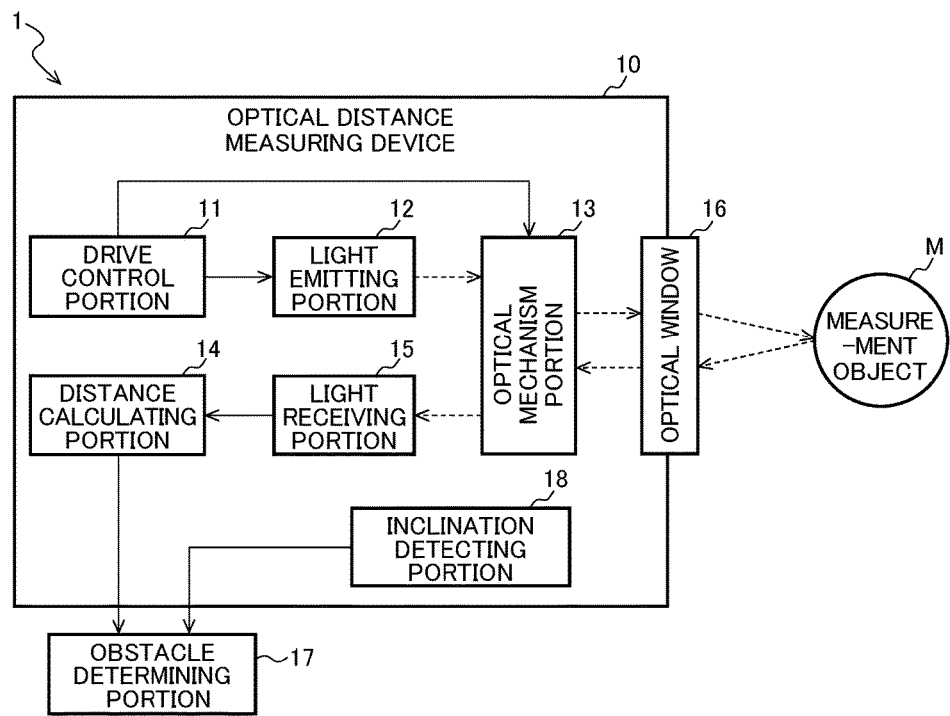
FIG. 8 is a block diagram illustrating one configuration example of an obstacle determining apparatus according to a seventh embodiment of the invention.
Figure 9:
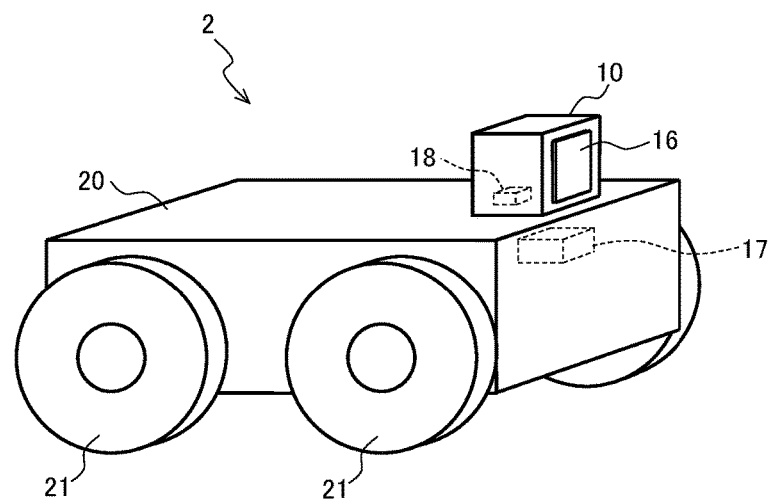
FIG. 9 is an external view illustrating one configuration example of a moving body provided with the obstacle determining apparatus of FIG. 8.
Figure 10:
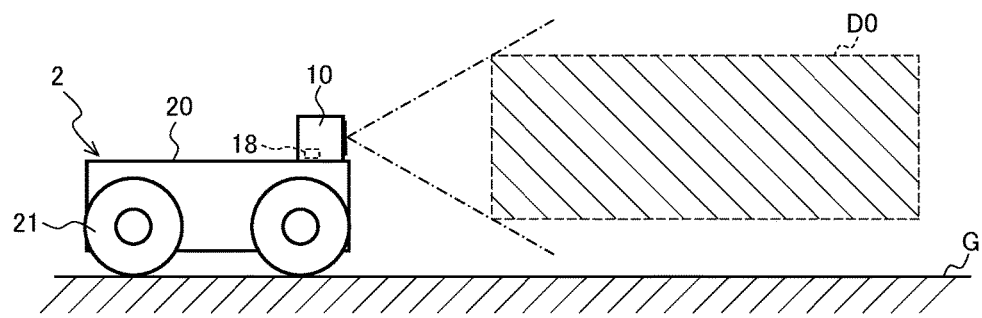
FIG. 10 is a cross-sectional view taken along an advancing direction for illustrating an example of a measurement space region of the moving body of FIG. 9 in a normal state.
Figure 11A:
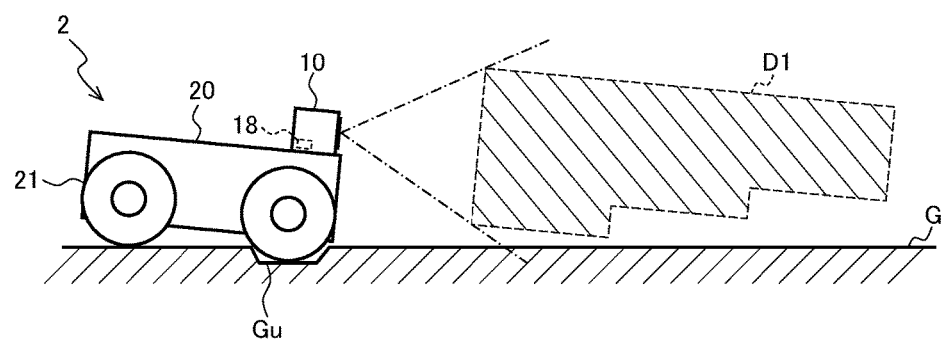
FIG. 11A is a schematic view illustrating an example in which the measurement space region of FIG. 10 changes due to a topographic change in the moving body of FIG. 9.
Figure 11B:
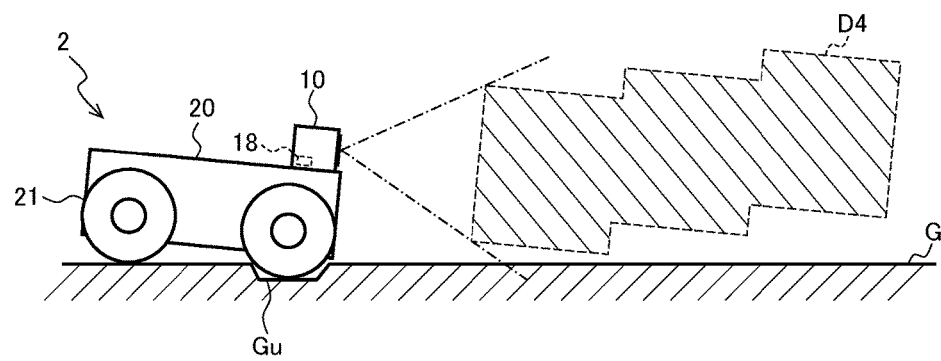
FIG. 11B is a schematic view illustrating another example in which the measurement space region of FIG. 10 changes due to a topographic change in the moving body of FIG. 9.

A seventh embodiment of the invention will be described with reference to FIG. 8 to FIG. 11B. FIG. 8 is a block diagram illustrating one configuration example of an obstacle determining apparatus according to the present embodiment, and FIG. 9 is an external view illustrating one configuration example of a moving body provided with the obstacle determining apparatus of FIG. 8. FIG. 10 is a cross-sectional view taken along an advancing direction for illustrating an example of a measurement space region of the moving body 2 of FIG. 9 in a normal state, and both FIG. 11A and FIG. 11B are schematic views each illustrating an example in which the measurement space region of FIG. 10 changes due to a topographic change in the moving body of FIG. 9.

As exemplified in FIG. 8, the obstacle determining apparatus 1 according to the present embodiment includes, similarly to the first embodiment illustrated in FIG. 1, the optical distance measuring device (hereinafter, simply referred to as the distance measuring device) 10 which measures a distance to a measurement object M by an optical measuring mechanism, and the obstacle determining portion 17. In the present embodiment and embodiments described below, the obstacle determining apparatus 1 includes an inclination detecting portion 18 which detects inclination (tilt) of the distance measuring device 10. Other configurations are similar to those of the embodiment illustrated in FIG. 1, so that description thereof will be omitted.

The obstacle determining apparatus 1 according to the present embodiment includes the inclination detecting portion 18 which detects inclination (tilt) of the distance measuring device 10. Note that, since a result of distance measurement by the distance measuring device 10 is used for determination of an obstacle, inclination of a detection object means inclination of the obstacle determining apparatus. The inclination detecting portion 18 is only required to detect inclination of the distance measuring device 10, and is thus able to be provided not only inside the distance measuring device 10 but also in the main body 20 of the moving body 2 provided with the distance measuring device 10. Various examples of the inclination detecting portion 18 include inclination sensors such as an acceleration sensor, a gyro sensor, and a 3-axis geomagnetic sensor, and one that uses magnetic fluid as an inclination sensor may be used. Note that, a direction of gravitational acceleration may be detected when the acceleration sensor is adopted, an inclination velocity (angular velocity) may be integrated when the gyro sensor is adopted, and a change in an inclination direction may be checked when the 3-axis geomagnetic sensor is adopted.

When a value of the inclination, which is input from the distance measuring device 10, is indefinite and not reliable, the obstacle determining portion 17 preferably causes the wheel drive control portion to output a determination result to slow down by predicting collision with an obstacle, as control independent from processing as characteristics of the present embodiment and other embodiments described below.

When a detection result of the inclination detecting portion 18 indicates that the inclination of the distance measuring device 10 is changed to a pitch direction (forward inclination or backward inclination direction) and/or a roll direction (lower left or lower right direction), the measurement space region as a main characteristic of the present embodiment is changed so that a position of a bottom surface of the measurement space region changes stepwisely or continuously according to a depth in a forward direction and/or a width direction of the measurement space region. Of course, the change of the position of the bottom surface refers to a change in an upper direction or a lower direction. Also when the position of the bottom surface is originally set to change stepwisely or continuously according to the depth, detection of the change of the inclination triggers to change the measurement space region such as changing of the degree of the change or changing of tendency (changing from a change in the upper direction to a change in the lower direction, or changing to the contrary). Though not described basically below, setting of the measurement space region may be performed by the obstacle determining portion 17 and the determination that the inclination is changed may be performed, for example, by referring to the detection result of the inclination within a predefined time.

When the detection result of the inclination detecting portion 18 indicates that the inclination of the distance measuring device 10 is changed to a forward inclination direction (that is, a direction of forward inclination state), the measurement space region as a main characteristic of the present embodiment is changed so that the position of the bottom surface of the measurement space region becomes higher stepwisely or continuously according to the depth in the forward direction of the measurement space region (that is, as the depth increases).

Description will be given with a specific example. FIG. 10 is a cross-sectional view taken along an advancing direction for illustrating an example of a measurement space region of the moving body 2 of FIG. 9 in a normal state. The measurement space region D0 is a rectangular parallelepiped region defined in a region that is able to be measured by the distance measuring device 10, and an upper surface and a bottom surface of the measurement space region D0 in the model arrangement are parallel to a ground G in cross section.

As described in the first embodiment with use of FIG. 3A to FIG. 3D, even the exemplified measurement space region D0 has no trouble because the model arrangement is achieved as long as the ground G is flat. However, when there is a depression (concave portion) Gu on the ground G and wheels 21 of a conventional moving body 2 falls in the depression Gu, the distance measuring device 10 is inclined with the main body 20 and the ground G may be detected as an obstacle. The moving body 2 is to perform an avoiding operation such as stopping for safety even when there is nothing to be an obstacle for traveling, so that usability is lowered.

The cause of such erroneous detection lies in that at a time when the main body 20 (vehicle body) and the distance measuring device 10 of the moving body 2 are inclined forward by concave and convex or a level difference due to a depression or the like, the measurement region at a position away from the distance measuring device 10 (in a depth direction) is more greatly shifted in a direction of the ground G. This point is focused on in the present embodiment, and it is configured so as to detect a change to the forward inclination direction of the inclination by the inclination detecting portion 18, and when such a change is caused, by considering height of the measurement space region D0 by the vehicle body after the change (after being inclined forward) from the ground G, the measurement space region D0 is modified so as to lift a set coordinate in a height direction of the bottom surface thereof like in the measurement space region D1 of FIG. 11A. Thereby, only an object on the ground G is able to be detected without detecting the ground G and the obstacle determining portion 17 is prevented from determining the ground G as an obstacle.

Specifically, similarly to the measurement space region D0, the measurement space region D1 is a region defined in a region that is able to be measured by the distance measuring device 10 and is a region changed so that a position of a bottom surface thereof becomes higher stepwisely (the bottom surface is floated) as the depth increases in the measurement space region D0 (as a vertical distance from the optical window 16 is longer). This change is executed when the detection result of the inclination detecting portion 18 indicates that the inclination of the distance measuring device 10 is changed to a forward inclination direction as described above. When the position is made higher stepwisely, a degree of making the position higher according to the depth may be at a constant rate as exemplified in the measurement space region D1 (that is, the position may be made higher in proportion to the depth), but may not be at a constant rate. Though not illustrated here, the position may be changed to be higher not stepwisely but continuously (in a smooth slope shape) as the depth increases.

The measurement space region after the change in a scene where the change to the forward inclination is detected in the present embodiment is set but not limited to have a position of an upper surface thereof at a constant height regardless of the depth (regardless of a distance to a measurement object) as exemplified in FIG. 11A. Note that, the constant height here means that the height from the ground at the time of the model arrangement is constant. For example, the measurement space region after the change may be set so that the position of the upper surface of the measurement space region becomes higher stepwisely or continuously as the depth increases in the forward direction. One example of the measurement space region set in such a manner is a measurement space region D4 illustrated in FIG. 11B.

In the measurement space region D4, not only the position of the bottom surface thereof is made high but also the position of the upper surface thereof is made high accordingly in order to prevent the ground G from being erroneously detected as an obstacle due to a change of the inclination to the forward inclination direction. Thus, even in the scene where the change of the inclination to the forward inclination direction is detected (hereinafter, a scene where the change to the forward inclination is detected), not only a volume of the measurement space region is able to be maintained constantly at a certain degree but also an obstacle which is hung at a certain degree of height is able to be detected from a remote position. Of course, a degree of the change of the height of the bottom surface position and a degree of the change of the height of the upper surface position may be different from each other.

Description has been given by assuming that the measurement space region (the measurement space region D0 in the example of FIG. 10) before positions of the bottom surface and the upper surface are changed has a rectangular parallelepiped shape, but without limitation thereto, the measurement space region may be set to have any shape. As the measurement space region before the change, for example, not a rectangular parallelepiped in which a bottom surface has the same height in the width direction but a region in which a bottom surface has different heights in the width direction (which is basically set to be bilaterally symmetric as described above) is also able to be adopted. In such a case as well, as the measurement space region after the change, it is possible to change the position of the bottom surface (make higher in the present embodiment) according to the depth as to the same position in the width direction.

To give a specific example, as the measurement space region before the change, in a group of measurement points radially provided frontward with a light emission point of the optical window 16 as a center, a measurement space region in which a lower limit and an upper limit of the depth in the forward direction are provided and width and height directions are limited to be within a rectangular region which has a central axis passing through the center and vertical to the optical window 16 as a center, a measurement space region not having such limit (which is set not to be contact with the ground), or the like may be adopted. The latter corresponds to a shape obtained by excluding a tip end from a cone falling sideways (a fan shape when viewed laterally or from the top). The measurement space region after the change in the scene where the change to the forward inclination is detected is based on a shape of the measurement space region before the change, and, for example, when the measurement space region before the change has a shape obtained by excluding a tip end from a cone falling sideways, the position of the bottom surface (not a bottom surface of the cone but the bottoms surface of the measurement space region) is to be changed to be made higher stepwisely.

According to the present embodiment, without a complicated configuration or algorithm, simple algorithm makes it possible to prevent the ground from being erroneously determined as an obstacle even when shaking in the forward inclination direction due to an impact is caused or when encountering a concave of the ground, by changing the measurement space region in front of the distance measuring device 10 according to the change of the inclination in the forward inclination direction so that the ground is difficult to be detected. In the present embodiment, the measurement space region is narrowed, except for an example as in FIG. 11B, as being further from the distance measuring device 10, so that it can be said that there is substantially small influence on collision avoiding processing. An obstacle which is hung at a certain degree of height is not able to be detected from a remote position as indicated in the example of FIG. 11B, but is able to be detected from a closer position, thus making it possible to avoid collision with the obstacle.

When the height of the position of the bottom surface in the scene where the change to the forward inclination is detected is set to be high with a certain margin, erroneous detection of the ground is not caused even when the inclination greatly changes to the forward inclination direction. In this case, however, there may be a possibility that an object having a low height from the ground is not able to be detected, either. Accordingly, in order to avoid such a situation, without determining the height of the position of the bottom surface in the scene where the change to the forward inclination is detected at a constant value, it is preferable that a degree of changing the position of the bottom surface to be higher stepwisely or continuously is set to be great as a degree of the change of the inclination to the forward inclination direction, which is indicated by the detection result of the inclination detecting portion 18, is greater (in other words, as an amount of change of the inclination per unit time is greater). This is able to be realized by adjusting the height of the bottom surface according to the degree of the change to the forward inclination.

In the present embodiment, since a setting change of the measurement space region is executed in the scene where the change to the forward inclination is detected, the similar is executed also when a further change to the forward inclination direction is caused after the change.

However, there is also a scene where the inclination changes to the backward inclination direction and is returned to its original state, and then there is no change in the inclination, such as a scene where the front wheels pass through (goes out of) the depression Gu like in the example of FIG. 11A. It is actually necessary to cope with such a scene.

Thus, when it is indicated that the inclination of the distance measuring device 10 has no change to a direction causing the change of the position of the bottom surface, the measurement space region is preferably changed so that the change of the position of the bottom surface according to the depth in the forward direction of the measurement space region is returned to an original state.

Though the optical distance measuring device has been taken above as an example of the distance measuring device, not only laser light, infrared light, visible light, or the like but also ultrasonic waves, electromagnetic waves, or the like may be adopted to be radiated for sensing, and this is also applied to embodiments described below. That is, the obstacle determining apparatus is able to include a distance measuring device which measures a distance by radiating ultrasonic waves, electromagnetic waves, or the like, instead of the optical distance measuring device. In particular, by adopting contrivance such as providing of directivity, presence or absence of an object at each measurement point is able to be sensed also by ultrasonic waves or the like. However, a laser is preferably used because of having excellent weather resistance and high measurement accuracy.

(Eighth Embodiment)

Figure 12A:
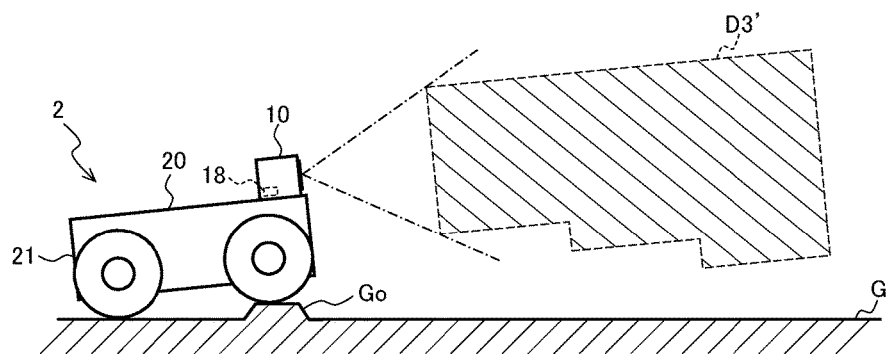
FIG. 12A is a schematic view illustrating an example in which the measurement space region of FIG. 10 changes due to a topographic change in a moving body provided with an obstacle determining apparatus according to an eighth embodiment of the invention.
Figure 12B:
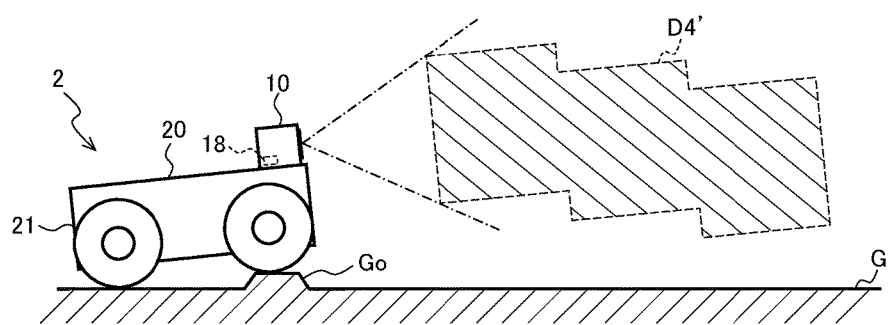
FIG. 12B is a schematic view illustrating another example in which the measurement space region of FIG. 10 changes due to a topographic change in the moving body provided with the obstacle determining apparatus according to the eighth embodiment of the invention.

An eighth embodiment of the invention will be described with reference to FIG. 12A and FIG. 12B. Both FIG. 12A and FIG. 12B are schematic views each illustrating an example in which the measurement space region of FIG. 10 changes due to a topographic change in a moving body including an obstacle determining apparatus according to the present embodiment. Note that, in the present embodiment, though description for overlapping parts with the seventh embodiment will be partially omitted, various applications described in the seventh embodiment are able to be applied.

When the detection result of the inclination detecting portion 18 indicates that the inclination of the distance measuring device 10 is changed to the backward inclination direction due to a projection Go on the ground G or the like (hereinafter, referred to as a scene where the change to the backward inclination is detected) as exemplified with a measurement space region D3' of FIG. 12A, a measurement space region of the present embodiment is changed so that a position of a bottom surface of the measurement space region becomes lower stepwisely according to a depth in a forward direction of the measurement space region.

The measurement space region D3' is obtained by changing (modifying) a set coordinate in the height direction of the bottom surface of the measurement space region D0 so as to be lowered in the lower direction by considering the height of the measurement space region D0 by the vehicle body in the scene where the change to the backward inclination is detected from the ground G. Thereby, even in a scene where the moving body 2 is in a state of being inclined backward, a low object placed on the ground G is able to be detected as an obstacle without omission. Though described below with an example of FIG. 13A, the set coordinate may be changed so as to be lowered not stepwisely but continuously as the depth increases.

The measurement space region after the change in the scene where the change to the backward inclination is detected in the present embodiment is set so that a position of an upper surface of the measurement space region is at a constant height regardless of the depth as exemplified in FIG. 12A, but there is no limitation thereto similarly to the seventh embodiment. For example, the measurement space region after the change in the scene where the change to the backward inclination is detected may be set so that the position of the upper surface of the measurement space region becomes lower stepwisely or continuously as the depth increases in the forward direction. One example of the measurement space region set in such a manner is a measurement space region D4' illustrated in FIG. 12B.

In the measurement space region D4', not only the position of a bottom surface becomes low but also the position of the upper surface becomes low accordingly in order to prevent detection omission for a low object on the ground G due to the inclination to the backward inclination direction. Thus, even in the scene where the change to the backward inclination is detected, not only a volume of the measurement space region is able to be maintained constantly at a certain degree but it is also possible to prevent a situation where an obstacle which is hung at a certain degree of height but through which the moving body 2 is able to pass without detection as an obstacle is detected. Of course, a degree of the change of the height of the bottom surface position and a degree of the change of the height of the upper surface position may be different from each other.

A shape of the measurement space region before and after the change in the scene where the change to the backward inclination is detected is not limited to a rectangular parallelepiped as exemplified with the measurement space region D0, D3', or D4', and may be set to have any shape similarly to the application in the seventh embodiment. For example, as the measurement space region before the change, for example, not a rectangular parallelepiped in which a bottom surface has the same height in a width direction but a region in which a bottom surface has different heights in the width direction (which is basically set to be bilaterally symmetric as described above) is also able to be adopted. In such a case as well, as the measurement space region after the change, it is possible to change the position of the bottom surface (make lower in the present embodiment) according to the depth as to the same position in the width direction.

According to the present embodiment, without a complicated configuration or algorithm, simple algorithm makes it possible to detect a low object placed on the ground G earlier without omission even when shaking in the backward inclination direction due to an impact is caused or when encountering a convex (projection) of the ground, by changing the measurement space region in front of the distance measuring device 10 according to the change of the inclination in the forward inclination direction so that the ground is difficult to be detected.

In the present embodiment, the measurement space region is expanded except for an example as in FIG. 12B, so that it can be said that there is substantially small influence on collision avoiding processing. In the example of FIG. 12B, it is also possible to prevent detection of an obstacle, which is hung at a certain degree of height, from a remote position.

When the height of the position of the bottom surface in the scene where the change to the backward inclination is detected is set to be low with a certain margin, detection omission for a low object is not caused even when the inclination greatly changes to the backward inclination direction. In this case, however, there may be a possibility that the ground is erroneously detected as an obstacle to the contrary. Accordingly, in order to avoid such a situation, without determining the height of the position of the bottom surface in the scene where the change to the backward inclination is detected at a constant value, it is preferable that a degree of changing the position of the bottom surface to be lower stepwisely or continuously is set to be great as a degree of the change of the inclination to the backward inclination direction indicated by the detection result of the inclination detecting portion 18 is greater. This is able to be realized by adjusting the height of the bottom surface according to the degree of the change to backward inclination.

In the present embodiment, since a setting change of the measurement space region is executed in the scene where the change to the backward inclination is detected, the similar is executed also when a further change to the backward inclination direction is caused after the change. However, there is also a scene where the inclination changes to the forward inclination direction and is returned to its original state, and then there is no change in the inclination, such as a scene where the front wheels pass through (goes out of) the projection Go like in the example of FIG. 12A. It is actually necessary to cope with such a scene.

Thus, in the present embodiment as well, when it is indicated that the inclination of the distance measuring device 10 has no change to a direction causing the change of the position of the bottom surface, the measurement space region is preferably changed so that the change of the position of the bottom surface according to the depth in the forward direction of the measurement space region is returned to an original state.

Moreover, both functions of the present embodiment and the seventh embodiment are able to be used together. However, in a case where the processing for returning the position of the bottom surface to its original state as described above is applied to both of the present embodiment and the seventh embodiment to use in combination, when there is a change in the inclination, the change may be stored only for a short while. Thereby, it is possible to determine whether to be a scene where the position is returned to its original state or a scene where the inclination is changed from a state where there is no change in the inclination.

(Ninth Embodiment)

Figure 13B:
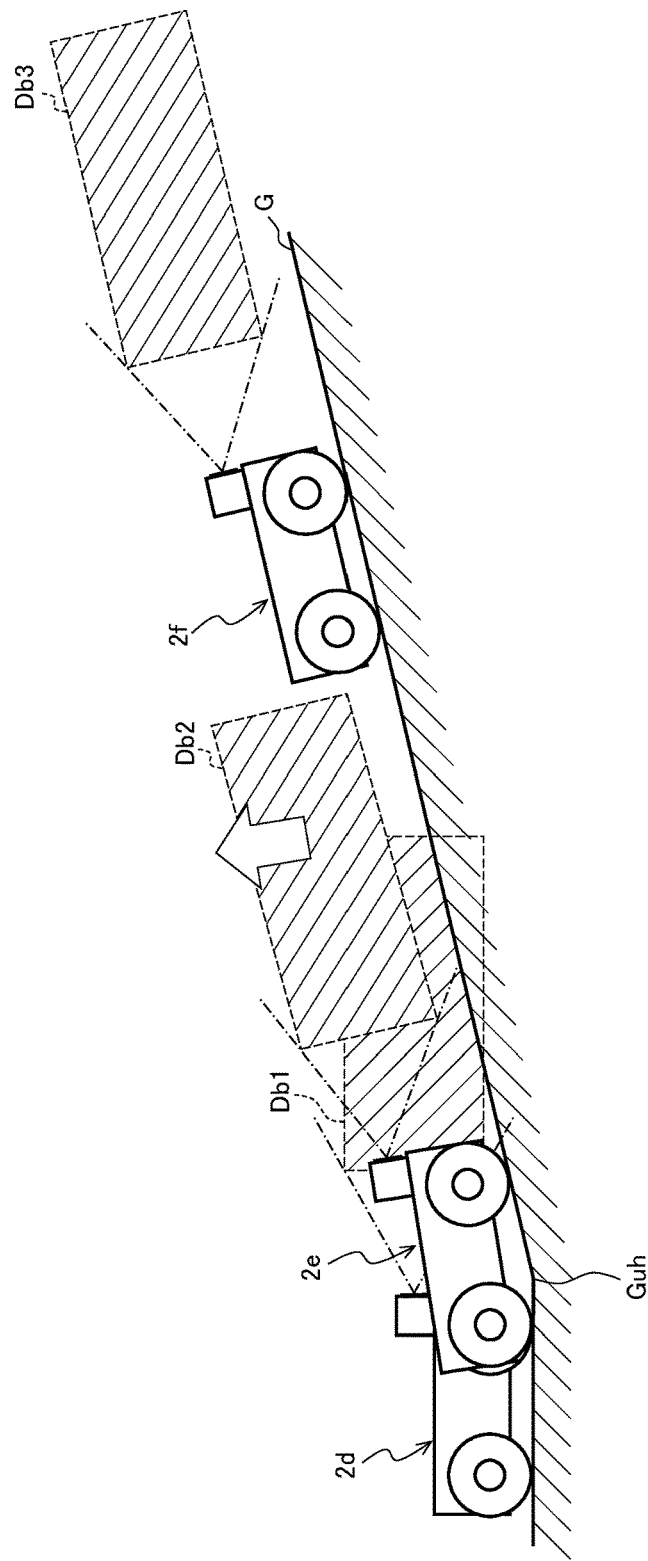
FIG. 13B is a schematic view illustrating an example in which the measurement space region of FIG. 10 changes due to entering an uphill and returns to its original state in the moving body provided with the obstacle determining apparatus according to the ninth embodiment of the invention.

A ninth embodiment of the invention will be described with reference to FIG. 13A and FIG. 13B. FIG. 13A and FIG. 13B are schematic views each illustrating an example in which the measurement space region of FIG. 10 changes due to respectively entering a downhill and an uphill and returns to its original state in a moving body provided with an obstacle determining apparatus according to the present embodiment. In the present embodiment, though description for overlapping parts with the seventh and eighth embodiments will be basically omitted and different points will be mainly described, various applications described in the seventh and eighth embodiments are able to be applied.

When the detection result of the inclination detecting portion 18 indicates that inclination of the distance measuring device 10 is changed to a forward inclination direction (a scene where a change to the forward inclination is detected), a measurement space region of the present embodiment is changed so that a position of a bottom surface thereof becomes lower stepwisely or continuously according to a depth in a forward direction of the measurement space region.

To the contrary, when the detection result of the inclination detecting portion 18 indicates that the inclination of the distance measuring device 10 is changed to a backward inclination direction (a scene where a change to the backward inclination is detected), the measurement space region of the present embodiment is changed so that the position of the bottom surface thereof becomes higher stepwisely or continuously according to the depth in the forward direction of the measurement space region. Note that, in an obstacle determining apparatus 1 in the present embodiment, an example in which both of processing in the scene where the change to the forward inclination is detected and processing in the scene where the change to the backward inclination is detected are executed is indicated, but only one of them may be adopted.

As has been described in the seventh embodiment, the determination that the inclination is changed may be performed by referring to a detection result within a predefined time. However, though the time predefined correspondingly to the seventh embodiment may be the same as the time predefined correspondingly to the eighth embodiment, the time predefined correspondingly to the ninth embodiment is preferably longer than each of the aforementioned times in consideration of a difference between detection objects.

In the present embodiment as well, when it is indicated that the inclination of the distance measuring device 10 has no change to a direction causing the change of the position of the bottom surface, the measurement space region is preferably changed so that the change of the position of the bottom surface according to the depth in the forward direction of the measurement space region is returned to an original state. Thereby, it is possible to return processing to original obstacle determining processing when a state shifts to a state where there is no change in the inclination (a state of traveling on a flat ground or an uphill/downhill with a constant gradient).

Description will be given with a specific example. First, description will be given with reference to FIG. 13A for a scene where the moving body 2 travels on a flat road (a position indicated with a moving body 2a), front wheels then enter a downhill with a constant gradient, a branch point of which is indicated with Gdh, (a position indicated with a moving body 2b), and after that, rear wheels also enter the downhill (a position indicated with a moving body 2c).

When the moving body 2 reaches the position of the moving body 2b, a change to the forward inclination is detected (that is, the scene where the change to the forward inclination is detected is reached). When reaching the scene where the change to the forward inclination is detected, a bottom surface and an upper surface of a measurement space region Da1 (which is the same as the measurement space region D0) are changed to be lower continuously as the depth in the forward direction increases like a measurement space region Da2. In this case, change is preferably made so that the bottom surface becomes parallel to a slope of the downhill. That is, in the present embodiment as well, it is preferable that a degree of changing the position of the bottom surface stepwisely or continuously is set to be great as a degree of the change of the inclination indicated by the detection result of the inclination detecting portion 18 is greater. This is able to be realized by adjusting the height of the bottom surface according to the degree of the change to the forward inclination.

After that, when it is indicated that the inclination of the distance measuring device 10 has no change (that is, when having passed through the scene where the change to the forward inclination is detected), the measurement space region Da2 is returned to its original state to be the measurement space region Da3 which is the same as the measurement space region Da1 (so that the bottom surface is parallel to the slope of the downhill). Note that, though the measurement space region Da3 is illustrated as a region at a time point when the moving body 2 reaches the position of the moving body 2c, the measurement space region Da3 is actually provided earlier. Though the example in which the moving body 2 enters the downhill from the flat road is taken, similar processing may be performed also in another scene where no change of the inclination is seen after the scene where the change to the forward inclination is detected (for example, such as a scene of entering, from an uphill, an uphill having a reduced gradient or a scene of entering, from a downhill, a downhill having an increased gradient).

Next, description will be given with reference to FIG. 13 for a scene where the moving body 2 travels on a flat road (a position indicated with a moving body 2d), front wheels then enter an uphill with a constant gradient, a branch point of which is indicated with Guh, (a position indicated with a moving body 2e), and after that, rear wheels also enter the uphill (a position indicated with a moving body 2f).

When the moving body 2 reaches the position of the moving body 2e, a change to the backward inclination is detected (that is, the scene where the change to the backward inclination is detected is reached). When reaching the scene where the change to the backward inclination is detected, a bottom surface and an upper surface of a measurement space region Db1 (which is the same as the measurement space region D0) are changed to be higher continuously as the depth in the forward direction increases like a measurement space region Db2. In this case, change is preferably made so that the bottom surface becomes parallel to a slope of the uphill. That is, in this case as well, it is preferable that a degree of changing the position of the bottom surface stepwisely or continuously is set to be great as a degree of the change of the inclination indicated by the detection result of the inclination detecting portion 18 is greater. This is able to be realized by adjusting the height of the bottom surface according to the degree of the change to the backward inclination.

After that, when it is indicated that the inclination of the distance measuring device 10 has no change (that is, when having passed through the scene where the change to the backward inclination is detected), the measurement space region Db2 is returned to its original state to be the measurement space region Db3 which is the same as the measurement space region Db1 (so that the bottom surface is parallel to the slope of the uphill). Note that, though the measurement space region Db3 is illustrated as a region at a time point when the moving body 2 reaches the position of the moving body 2$f$, but the measurement space region Db3 is actually provided earlier. Though the example in which the moving body 2 enters the uphill from the flat road has been taken, similar processing may be performed also in another scene where no change of the inclination is seen after the scene where the change to the backward inclination is detected (for example, such as a scene of entering, from an uphill, an uphill having an increased gradient or a scene of entering, from a downhill, a downhill having a reduced gradient).

Though the example in which the upper surface and the bottom surface are changed according to the change of the gradient of the ground is taken, of course, only the bottom surface may be changed as exemplified with FIG. 11A and FIG. 12A. In the present embodiment as well, as the measurement space region before and after the change, not a region, like a rectangular parallelepiped, which has the same height in the width direction, but a region which has different heights in the width direction is able to be adopted.

According to the present embodiment, without a complicated configuration or algorithm, simple algorithm makes it possible to prevent erroneous determination of a ground as an obstacle or detection omission of a low object on the ground even when encountering a scene where the incline of the ground changes, by changing the measurement space region in front of the distance measuring device 10 according to the change of the inclination in the forward inclination direction so that the ground is difficult to be detected.

The processing in the present embodiment is processing before and after the gradient of the ground changes, in which the bottom surface is changed to a reverse direction to that of the processing in the seventh and eighth embodiments. However, with contrivance, the function of the present embodiment is ale able to be used together with the function of the seventh and/or eighth embodiments.

To describe an example thereof briefly, the processing may be classified based on whether or not the change of the inclination causing the change of the height of the bottom surface has continued for a predetermined time period. Note that, this predetermined time period is set as, for example, a time which is predefined correspondingly to the ninth embodiment and the time predefined correspondingly to the seventh embodiment may be set to be shorter than the predetermined time. A case where a time period of the change of the inclination is less than the predetermined time period is determined as a scene of riding over a depression or a projection like in the seventh/eighth embodiments and the measurement space region D0 (Da1/Da2) may be changed, for example, like in FIG. 11A (or FIG. 11B) or FIG. 12A (or FIG. 12B). Then, at a stage in which the predetermined time period has elapsed, it may be determined as a scene of passing though the ground having a reduced or increased gradient like in the present embodiment and the measurement space region D0 (Da1/Da2) may be changed like in FIG. 13A or FIG. 13B.

When such processing in which the continued time of the change of the inclination is checked is adopted, it is natural that a scene where the predetermined time period has elapsed is encountered. Such a scene includes a scene where processing by which a low object on a ground is difficult to be detected once is executed and a scene where processing by which the ground is easy to be detected once is executed.

In the former scene, when the gradient of the ground is reduced, for example, like in FIG. 13A, the measurement space region is changed to the measurement space region D1 of FIG. 11A or the measurement space region D2 of FIG. 11B once and a low object on the ground is difficult to be detected remotely. In this case, however, the low object is able to be detected from a near position and thus there is no particular trouble in obstacle detection.

In the latter scene, when the gradient of the ground is increased, for example, like in FIG. 13B, the measurement space region is changed to the measurement space region D3' of FIG. 12A or the measurement space region D4' of FIG. 12B once and the ground is easy to be detected. It is possible to cope with such a scene by adopting contrivance that the measurement space region is divided into a near-side measurement space region used for determination for stopping and a far-side measurement space region for determination for slowing down so that determination in the far side does not cause stopping as described below, for example, in eleventh and twelfth embodiments.

(Tenth Embodiment)

Figure 14:
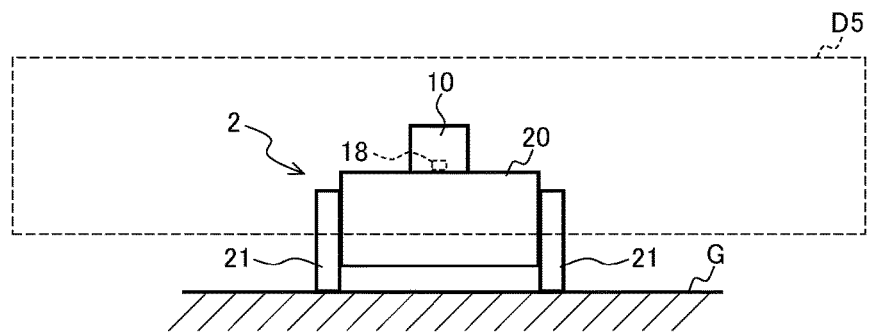
FIG. 14 is a cross-sectional view of a plane vertical to an advancing direction for illustrating an example of a measurement space region of a moving body provided with an obstacle determining apparatus according to a tenth embodiment of the invention.
Figure 15A:
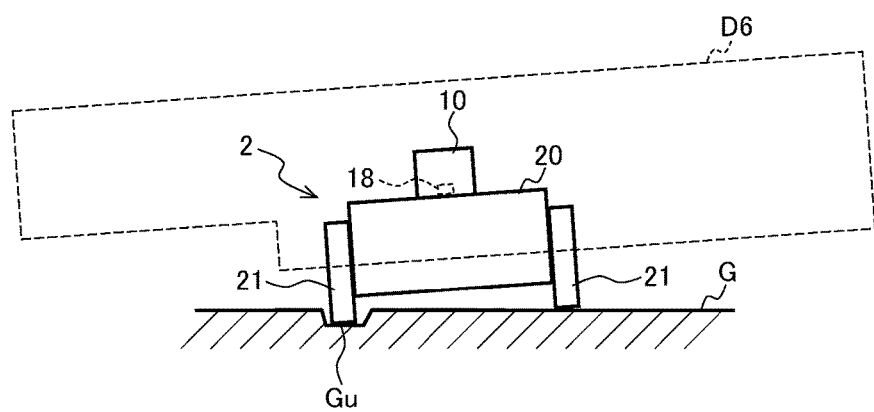
FIG. 15A is a schematic view illustrating an example in which the measurement space region of FIG. 14 changes due to a topographic change.

A tenth embodiment of the invention will be described with reference to FIG. 14 to FIG. 16. FIG. 14 is a cross-sectional view of a plane vertical to an advancing direction for illustrating an example of a measurement space region of a moving body provided with an obstacle determining apparatus according to the tenth embodiment of the invention, and each of FIG. 15A to FIG. 15C and FIG. 16 is a schematic view illustrating an example in which the measurement space region of FIG. 14 changes due to a topographic change. In the present embodiment, though points different from those of the seventh embodiment will be mainly described, various applications described in the seventh and other embodiments are able to be applied.

As to the measurement space region in the present embodiment, when a detection result of the inclination detecting portion 18 indicates that inclination of the distance measuring device 10 is changed to a left roll direction or a right roll direction (direction inclined to the lower left or the lower right), the measurement space region is changed so that a position of a bottom surface of the measurement space region becomes higher stepwise or continuously according to a depth in the left direction or the right direction of the measurement space region.

To describe more specifically, in the present embodiment, a laterally long measurement space region (long in a width direction) particularly as exemplified with a measurement space region D5 of FIG. 14 is suitable for a measurement space region in a normal state (corresponding to the measurement space region D0). In the case of the measurement space region D0 which is short in the width direction as exemplified in FIG. 3C, a situation where the ground is detected at a position of the bottom surface due to the right or left roll is hard to occur.

Here, description will be given for a case where, as exemplified in FIG. 15A, a left wheel 21 engages into a depression Gu, such as a rut, on the ground G (or a right wheel 21 rides over a projection) and the inclination of the distance measuring device 10 changes to the left roll direction (the roll direction in which the left side is inclined downward) (hereinafter, referred to as a scene where the change to the left roll is detected). In the scene where a change to the left roll is detected, the measurement space region is set so that the position of the bottom surface becomes higher stepwise according to the depth in the left direction (as the depth in the left direction increases) as exemplified with a measurement space region D6. This makes it possible to prevent erroneous determination of the ground as an obstacle.

Figure 15B:
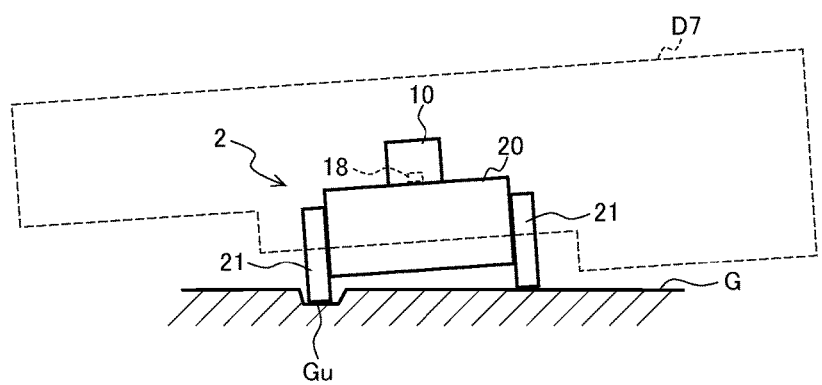
FIG. 15B is a schematic view illustrating another example in which the measurement space region of FIG. 14 changes due to a topographic change.
Figure 16:
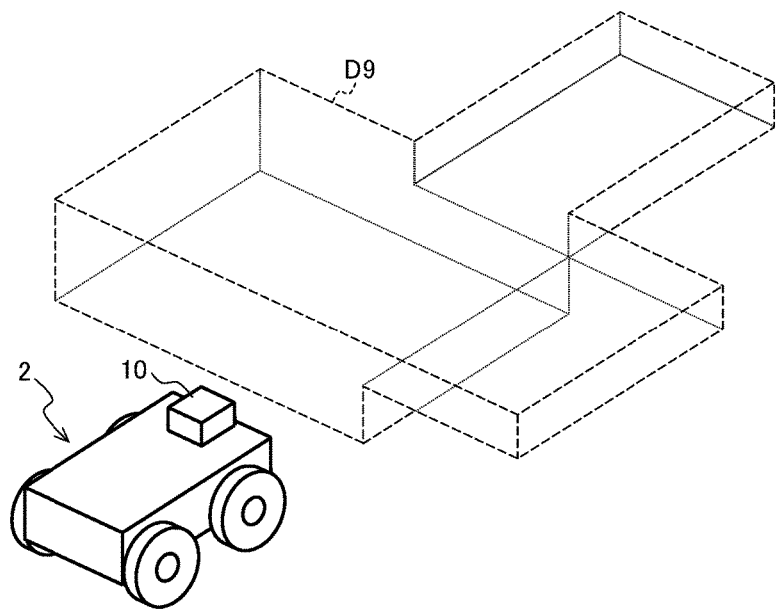
FIG. 16 is a schematic view illustrating another example in which the measurement space region of FIG. 14 changes due to a topographic change.

Further, in the scene where the change to the left roll is detected, a region corresponding to a right side of the main body 20 may be also set so that the position of the bottom surface becomes lower together stepwisely according to the depth in the right direction (the bottom surface becomes higher stepwisely according to the depth in the left direction) as exemplified with a measurement space region D7 of FIG. 15B. Thereby, there becomes no detection omission for a low object on the ground. The height is changed stepwisely in both examples of FIG. 15A and FIG. 15B, but may be changed continuously as described above.

Figure 15C:
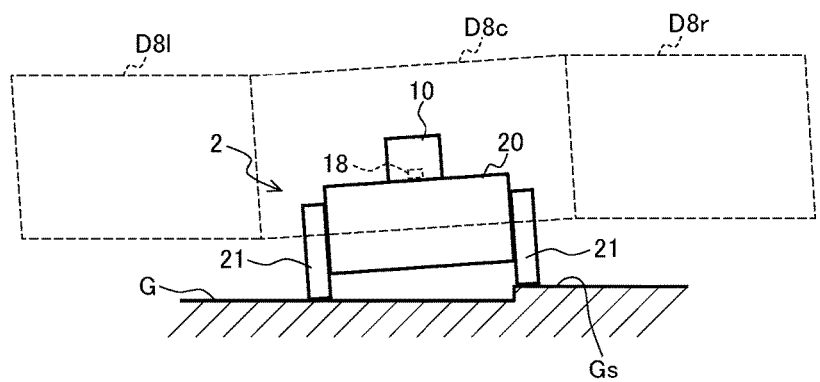
FIG. 15C is a schematic view illustrating another example in which the measurement space region of FIG. 14 changes due to a topographic change.

Furthermore, the scene where the change to the left roll is detected is provided also in a case where there is a level difference Gs on the ground G as exemplified in FIG. 15C. In such a scene or a scene where the depression GU or a projection exists, the measurement space region may be divided into a plurality of pieces in the width direction like partial regions D8l, D8c, and D8r of FIG. 15C so that each partial region may have a different height. The height of the bottom surface is not changed in the partial region D8c positioned in the center, the bottom surface is set to become higher continuously according to the depth in the left direction in the partial region D8l positioned on a left side, and the bottom surface is set to become lower continuously according to the depth in the right direction in the partial region D8r positioned on a right side (it can be also said that the bottom surface becomes higher continuously according to the depth in the left direction). Also in this example, it is possible to prevent erroneous determination of the ground as an obstacle and eliminate detection omission for a low object on the ground. Note that, though the measurement space region is divided into three in total of the center, and the right and left ends in this example, the number of division is not limited thereto and may be two or four or more. However, when the center is provided, at least a height of a partial region on the center is not changed.

Though the examples of the change of the inclination to the left roll direction have been taken above, the change to the right roll direction is able to be described by using the depth to the right direction correspondingly in a similar manner.

According to the present embodiment, without a complicated configuration or algorithm, simple algorithm makes it possible to prevent erroneous determination of a ground as an obstacle even when shaking to the roll direction due to an impact is caused or when encountering a concave, a convex, or a level difference on the ground, by changing the measurement space region in front of the distance measuring device 10 according to the change of the inclination in the roll direction so that the ground is difficult to be detected. By adopting the measurement space region like in the examples of FIG. 15B and FIG. 15C, a low object on the ground is not missed.

When the height of the position of the bottom surface when the change of the inclination to the roll direction is detected is set to be high with a certain margin, erroneous detection of the ground is not caused and thus there is no trouble even when the inclination changes to the roll direction to some extent. In this case, however, there may be a possibility an object on the ground, height of which is low, is not able to be detected, either. Accordingly, in order to avoid such a situation, it is preferable that a degree of making the position of the bottom surface higher stepwisely or continuously is great as a degree of the change of the inclination to the roll direction indicated by the detection result of the inclination detecting portion 18 is greater. An example of such setting has been exemplified in FIG. 15C.

In the present embodiment as well, it is possible to perform setting so that an upper surface of the measurement space region becomes higher according to the depth in the left direction or the right direction with a similar concept as those of the examples of changing the position of the upper surface described in the seventh/eighth embodiment. An example of such setting has been also exemplified in FIG. 15C.

In the present embodiment, since a setting change of the measurement space region is executed in the scene where the change to the left/right roll is detected, the similar is executed also when a further change to the left/right roll is caused after the change. However, there is also a scene where the inclination is changed to the opposite roll direction and is returned to its original state, and then there is no change in the inclination, such as a case of going out of the depression Gu of FIG. 15A or FIG. 15B or the level difference Gs of FIG. 15C. It is actually necessary to cope with such a scene.

Thus, when it is indicated that the inclination of the distance measuring device 10 has no change to a direction causing the change of the position of the bottom surface, the measurement space region is preferably changed so that the change of the position of the bottom surface according to the depth in the left/right direction of the measurement space region is returned to an original state.

As clear from the description above, processing in the present embodiment is processing independent from the processing of the seventh to ninth embodiments. Thus, the obstacle determining apparatus 1 is also able to include only the function of the present embodiment without including the functions of the seventh to ninth embodiments. However, the obstacle determining apparatus 1 is preferably able to cope with both processing, and thus preferably includes the function of the present embodiment with the functions of the seventh to ninth embodiments.

For example, when the present embodiment and the seventh embodiment are used together, by executing corresponding processing in the scene where the change to the forward inclination is detected like in the seventh embodiment and executing corresponding processing in the scene where the change to the roll direction is detected like in the present embodiment, it is possible to cope with even a scene where both of them occur at the same time. For example, in a scene where a change to the forward inclination and the right roll direction is detected, the bottom surface of the measurement space region is able to be lifted to the upper direction according to the depth in the forward direction and lifted to the upper direction according to the depth in the right direction like in a measurement space region D9 exemplified in FIG. 16.

(Eleventh Embodiment)

Figure 17A:
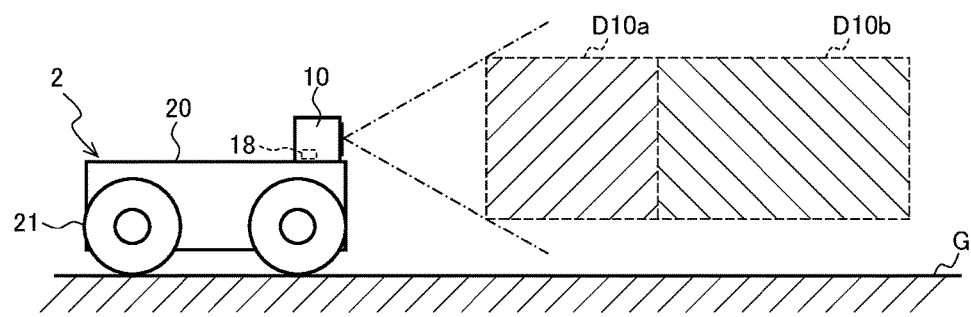
FIG. 17A is a cross-sectional view of a plane vertical to an advancing direction for illustrating an example of a measurement space region of a moving body provided with an obstacle determining apparatus according to an eleventh embodiment of the invention.
Figure 17B:
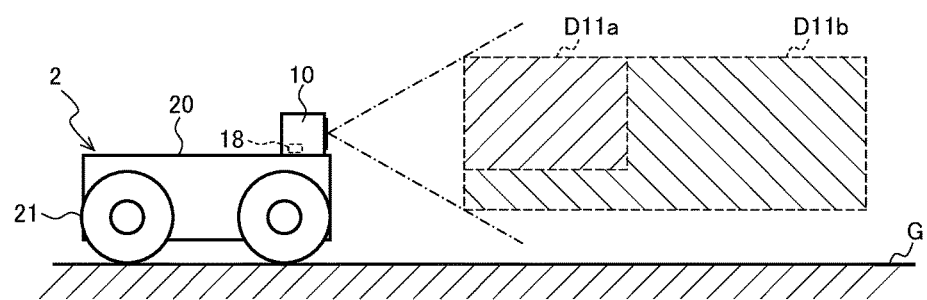
FIG. 17B is a cross-sectional view of a plane vertical to an advancing direction for illustrating another example of a measurement space region of the moving body provided with the obstacle determining apparatus according to the eleventh embodiment of the invention.
Figure 17C:
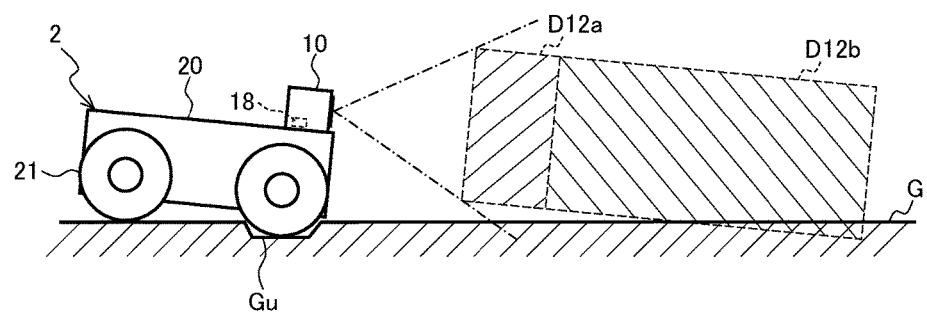
FIG. 17C is a schematic view illustrating an example in which the measurement space region of FIG. 17A changes due to a topographic change.

An eleventh embodiment of the invention will be described with reference to FIG. 17A to FIG. 17C. Each of FIG. 17A and FIG. 17B is a cross-sectional view of a plane vertical to an advancing direction for illustrating an example of a measurement space region of a moving body provided with an obstacle determining apparatus according to the present embodiment. FIG. 17C is a schematic view illustrating an example in which the measurement space region of FIG. 17A changes due to a topographic change. Note that, in the present embodiment, though description for overlapping parts with the seventh embodiment will be basically omitted, various applications described in the seventh and other embodiments are able to be applied.

The moving body according to the present embodiment includes the obstacle determining apparatus 1 like the moving body 2. The measurement space region used in the present embodiment has a first region provided at least in an upper part of a near side thereof and a second region which is another region (provided to include at least a far side). The wheel drive control portion controls the driving portion to stop the moving body 2 when it is determined that there is an obstacle in the first region, and controls the driving portion to slow down the moving body 2 when it is determined that there is an obstacle in the second region.

A partial region D10a and a partial region D10b exemplified in FIG. 17A respectively correspond to the first region and the second region, and a near side of the first region may be slightly floated like a partial region D11a and a partial region D11b exemplified in FIG. 17B.

The measurement space region divided into the first region and the second region like in the present embodiment is able to be applied to the measurement space region D0 of FIG. 10, the measurement space regions Da1 and Db1 of FIG. 13A and FIG. 13B, or the measurement space region D5 of FIG. 14. Further, the measurement space region divided into the first region and the second region like in the present embodiment is also able to be applied to the measurement space regions used in various scenes where the change of the inclination is detected (the measurement space regions D1 to D4' of FIG. 11A to FIG. 12B, the measurement space regions Da2 and Db2 of FIG. 13A and FIG. 13B, the measurement space regions D6 and D7 of FIG. 15A, FIG. 15B, and FIG. 15C, partial regions D8l, D8c, and D8r, or the like). Of course, it is able to be used only in the scene where the change of the inclination is detected without using in the scene where the change of the inclination is not detected.

According to the present embodiment, since the measurement space region is divided into the region for performing determination of slowing down and the region for performing determination of stopping based on a depth distance, the moving body 2 does not stop suddenly and is able to travel stably while considering risk by making the determination for slowing down performed easily. In particular, by slightly floating the region for performing determining of stopping as exemplified in FIG. 17B, it is possible to better avoid a situation where the moving body 2 suddenly stops when the gradient of the ground increases like in the example of FIG. 13B. In addition, since accuracy is required more in the example in which the measurement space region is divided like in the present embodiment, the optical distance measuring device 10 having excellent directivity is more preferable as the distance measuring device.

Though the examples in each of which the region is divided into two according to the depth in the forward direction (measurement distance) have been taken in the present embodiment, the region may be divided into the greater number to change a degree of slowing down. The region may be divided also in a roll direction with a similar concept.

Further, in the present embodiment, it may be configured so that the measurement space region divided into the first region (region for determination of stopping) and the second region (region for determination of slowing down) is used from the scene where the change of the inclination is not detected, and when the scene where the change of the inclination is detected is reached, a boundary between the region for determination of stopping and the region for determination of slowing down in the measurement space region is changed. For example, it may be configured so that the measurement space region formed by the partial regions D10a and D10b of FIG. 17A is normally used and the boundary is moved in the depth direction like in the partial regions D12a and D12b of FIG. 17C in the scene where the change to the forward inclination is detected or the boundary is moved so as to lift the region for determination of stopping like in the partial regions D11a and D11b of FIG. 17B. Thereby, it is possible to avoid a situation where the moving body 2 stops immediately, even when the ground is detected as an obstacle in the scene where the change to the forward inclination is detected, in other words, it is possible to perform setting so that the bottom surface of the measurement space region after the change is not lifted so much. The boundary may be returned to its original state when the scene where the change to the forward inclination is detected is canceled.

Though only the scene where the change to the forward inclination is detected according to the seventh embodiment is exemplified here, also in the scene where the change to the forward inclination is detected in the ninth embodiment, the scene where the change to the backward inclination is detected, and the scene where the change to the left/right roll is detected, usage as the measurement space region before the detection is allowed similarly. Further, the boundary is able to be changed also in the measurement space region after the change in such a scene with a similar concept of making difficult to stop or another concept.

For example, a similar concept to that of the scene where the change to the forward inclination is detected of the seventh embodiment is able to be applied basically to the scene where the change to the left/right roll is detected in the tenth embodiment, and an effect is achieved that it becomes difficult to stop due to detection of a remote object in a width direction. Further, in the scene where the change to the forward inclination is detected in the ninth embodiment (refer to FIG. 13A) and the scene where the change to the backward inclination is detected according to the eighth embodiment, for example, by using divided regions as the measurement space region before the detection or by moving the boundary similarly to the aforementioned examples, there is an effect that it is possible to allow a low object on the ground to enter only in the region for determination of slowing down early and it is possible to avoid stopping due to the object. In the scene where the change to the backward inclination is detected in the ninth embodiment (refer to FIG. 13B), by using the far side of the measurement space region Db1 as the region for determination of slowing down, the moving body 2 is only required to slow down without stopping at a stage of reaching the position of the moving body 2d. By making the region for determination of slowing down on the far side of the measurement space region Db2 whose bottom surface is lifted narrow oppositely to the example of FIG. 17C at a state where the moving body 2 reaches the position of the moving body 2e, it is possible to make the proximity and height of an object causing the determination of stopping the same as those at the position of the moving body 2d.

Note that, as clear from the description above, processing in the present embodiment is able to be executed as processing independent from the processing of the seventh to tenth embodiments. Thus, the obstacle determining apparatus 1 is also able to include only a function of the present embodiment without including the functions of the seventh to tenth embodiments. However, the obstacle determining apparatus 1 is preferably able to cope with both processing, and thus preferably includes the function of the present embodiment with the functions of the seventh to tenth embodiments.

(Twelfth Embodiment)

Figure 18:
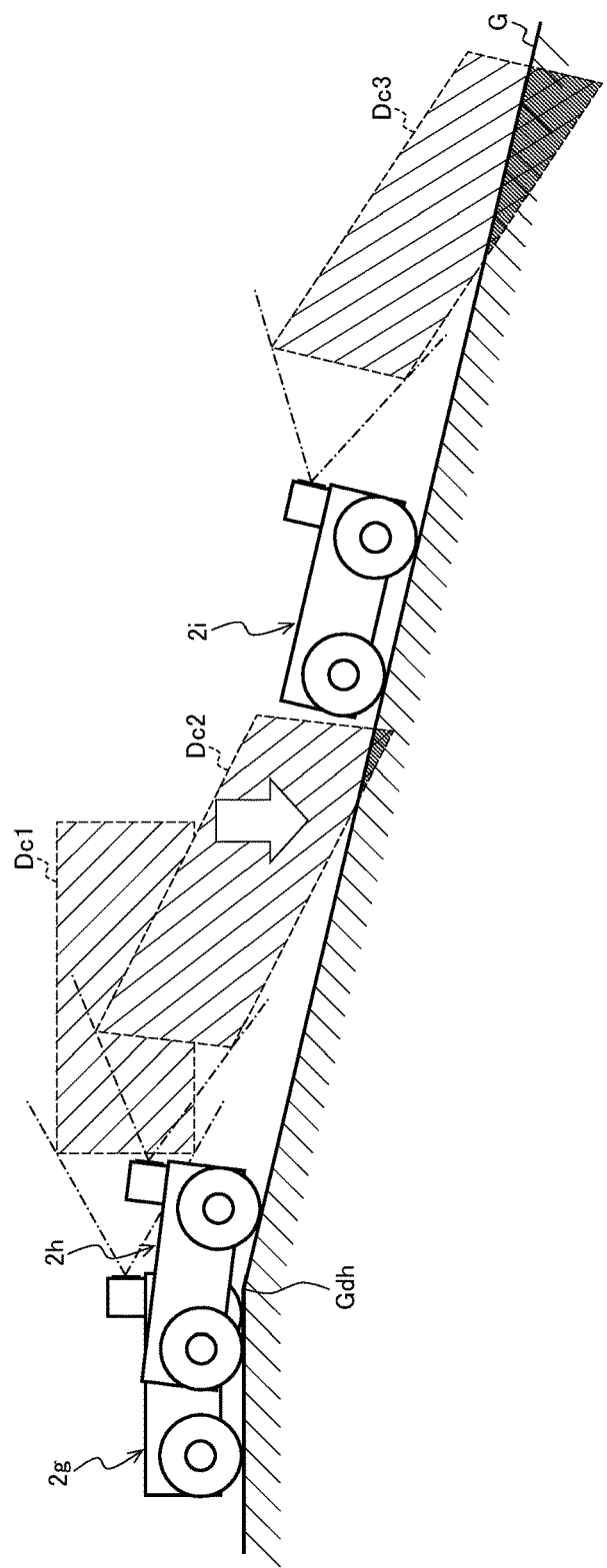
FIG. 18 is a schematic view illustrating an example in which the measurement space region of FIG. 10 changes due to entering an uphill in a moving body including an obstacle determining apparatus according to a twelfth embodiment of the invention.

A twelfth embodiment of the invention will be described with reference to FIG. 18. FIG. 18 is a schematic view illustrating an example in which the measurement space region of FIG. 10 changes due to entering an uphill in a moving body including an obstacle determining apparatus according to the present embodiment. Note that, in the present embodiment, though description for overlapping parts with the ninth embodiment will be basically omitted, various applications described in the ninth embodiment are able to be applied.

As described in the seventh and other embodiments, when it is indicated as an assumption that inclination of the distance measuring device 10 has no change to a direction causing change of a position of a bottom surface, the measurement space region in the present embodiment is changed so that the change of the position of the bottom surface according to a depth in the forward direction of the measurement space region is returned to an original state. When a detection result of the inclination detecting portion 18 indicates that the inclination of the distance measuring device 10 is changed to the forward inclination direction, the measurement space region in the present embodiment is set so that the position of the bottom surface is maintained for a fixed time period.

The scene which is the same as that of the example of FIG. 13A will be described with reference to FIG. 18. When the moving body 2 moves from a position of a moving body 2g and reaches a position of a moving body 2h, the change to the forward inclination is detected (that is, the scene where the change to the forward inclination is detected is reached). When reaching the scene where the change to the forward inclination is reached, a bottom surface and an upper surface of a measurement space region Dc1 (which is the same as the measurement space region Da1) are changed to be lower continuously as the depth in the forward direction increases like in a measurement space region Dc2. In this case, the bottom surface may be made parallel to the ground similarly to the measurement space region Da2 of FIG. 13A or may be lowered to a degree at which a slope of a downhill is detected as exemplified in FIG. 18. In the present embodiment as well, it is preferable that a degree of changing the position of the bottom surface stepwise or continuously is set to be great as a degree of the change of the inclination indicated by the detection result of the inclination detecting portion 18 is greater.

After that, even when it is indicated that the inclination of the distance measuring device 10 has no change (that is, when having passed through the scene where the change to the forward inclination is detected), the measurement space region Dc2 is maintained until a predetermined time period elapses. Here, an example in which the measurement space region Dc2 is maintained until the moving body 2 reaches a position of a moving body 2i (illustrated as a measurement space region Dc3) is taken. Note that, since the moving body 2 recognizes its vehicle speed, there is no problem if the fixed time period is defined as a time period during which a fixed distance is advanced, for example, 1 m or the like. When the fixed time period has elapsed, though not illustrated, the measurement space region is returned to an original state so as to be the same as the measurement space region Dc1 (so that the bottom surface becomes parallel to the slope of the downhill). Though the example in which the moving body 2 enters the downhill from a flat road has been taken, similar processing may be performed also in another scene where no change of the inclination is seen after the scene where the change to the forward inclination is detected (for example, such as a scene of entering, from an uphill, an uphill having a reduced gradient or a scene of entering, from a downhill, a downhill having an increased gradient).

According to the present embodiment, it is possible to intentionally determine the ground as an obstacle in the scene where the change to the forward inclination is detected to stop (when the measurement space region is used as the region for determination of stopping) or slow down (when the measurement space region is used as the region for determination of slowing down).

However, the present embodiment is preferably applied with the eleventh embodiment. In this case, it is possible to intentionally determine the ground as an obstacle in the region for determination of slowing down to slow down in the scene where the change to the forward inclination is detected, that is, slow down at a stage where the gradient of the ground starts to change downward so that the moving body 2 travels at a safety speed. This makes it possible to avoid a situation of slipping due to sudden stop on the downhill compared to a case where the measurement space region of the present embodiment is used only in the region for determination of stopping.

Without limitation to the scene where the change to the forward inclination is detected in the ninth embodiment and the example in which the tenth embodiment is applied thereto, the present embodiment is able to be applied similarly also to the scene where the change to the backward inclination is detected in the ninth embodiment and also in the seventh, eighth, and tenth embodiments. In such application, however, when the detection result of the inclination detecting portion 18 indicates that the inclination of the distance measuring device 10 is changed (the scene where the change of the inclination is detected in each example), the position of the bottom surface is set to be maintained for a fixed time period. An effect achieved by such application varies according to the applied example.

For example, in the example of FIG. 13B, by using the measurement space region Db1 as the region for determination of stopping or slowing down, the moving body 2 stops or slows down at a stage of reaching the position of the moving body 2d. Maintaining the measurement space region Db2 at a stage of reaching the position of the moving body 2e for a fixed time period means that a low object on the ground is not detected in an early stage (from a remote position) even when such an object is present. On the other hand, at the position of the moving body 2e, the gradient increases and a vehicle speed decreases so that a time for an avoiding operation increases. Thus, by applying the present embodiment, an effect is achieved that a low object on the ground is not required to be detected from a remote position.

In the examples of FIG. 11A and FIG. 11B, by returning the measurement space regions D1 and D4 to their original states after maintaining them for a fixed time period, an effect is achieved that control is not switched frequently even in the case of the ground in which concaves like the depression Gu are present continuously. In the examples of FIG. 12A and FIG. 12B, by returning the measurement space regions D3' and D4' to their original states after maintaining them for a fixed time period, an effect is achieved that control is not switched frequently even in the case of the ground in which convexes like the projection Go are present continuously. In the examples of FIG. 15A and the like, by returning the measurement space region D6 and the like to their original states after maintaining them for a fixed time period, an effect is achieved that control is not switched frequently even in the case of the ground on which a rut such as the depression Gu is engaged with or gone out from.
(OTHERS)

Though the obstacle determining apparatus and the moving body according to the invention have been described above, the invention can take a form as an obstacle determining method, procedure of which has been described. This obstacle determining method has an obstacle determining step of determining, based on a measurement result of a distance by a distance measuring device which measures a distance to a measurement object, presence/absence of an obstacle in a measurement space region in front of the distance measuring device. The measurement space region is defined so that a position of a bottom surface of the measurement space region changes stepwisely or continuously according to a depth in a forward direction and/or a width direction of the measurement space region. The obstacle determining method further has an inclination detecting step of detecting inclination of the distance measuring device by an inclination detecting portion. When a detection result at the inclination detecting step indicates that the inclination of the distance measuring device changes to a forward inclination direction and/or a roll direction, the measurement space region is changed so that the position of the bottom surface of the measurement space region changes stepwisely or continuously according to the depth in the forward direction and/or the width direction of the measurement space region. Other applications are as described for the obstacle determining apparatus and the moving body, and description thereof will be omitted.

The invention claimed is:

1. An obstacle determining apparatus comprising a distance measuring device which measures a distance to a measurement object, and an obstacle determining portion which determines presence/absence of an obstacle in a measurement space region in front of the distance measuring device based on a measurement result of the distance by the distance measuring device, wherein
the measurement space region is defined so that a position of a bottom surface of the measurement space region changes stepwisely according to a depth in a forward direction and/or a width direction of the measurement space region.

2. The obstacle determining apparatus according to claim 1, wherein the measurement space region is defined so that a position of an upper surface of the measurement space region has a constant height regardless of the depth.

3. The obstacle determining apparatus according to claim 1, wherein only when detecting the obstacle of a predetermined shape that includes at least a part of the bottom surface of the measurement space region defined in advance and indicates a ground, the obstacle determining portion changes definition of the measurement space region so that the position of the bottom surface becomes higher stepwisely.

4. The obstacle determining apparatus according to claim 1, wherein the measurement space region is defined so that a position of an upper surface of the measurement space region becomes higher stepwisely as the depth increases.

5. The obstacle determining apparatus according to claim 4, wherein only when detecting the obstacle of a predetermined shape that includes at least a part of the bottom surface of the measurement space region defined in advance and indicates a ground, the obstacle determining portion changes definition of the measurement space region so that the positions of the bottom surface and the upper surface become higher stepwisely.

6. The obstacle determining apparatus according to claim 1, further comprising
an inclination detecting portion which detects inclination of the distance measuring device, wherein
when a detection result of the inclination detecting portion indicates that the inclination of the distance measuring device is changed to a pitch direction and/or a roll direction, the measurement space region is changed so that the position of the bottom surface of the measurement space region changes stepwisely accordingly to the depth in the forward direction and/or the width direction of the measurement space region.

7. The obstacle determining apparatus according to claim 6, wherein when it is indicated that the inclination of the distance measuring device has no change to a direction causing the change of the position of the bottom surface, the measurement space region is changed so that the change of the position of the bottom surface according to the depth in the forward direction and/or the width direction of the measurement space region is returned to an original state.

8. The obstacle determining apparatus according to claim 6, wherein when the detection result of the inclination detecting portion indicates that the inclination of the distance measuring device is changed to a forward inclination direction, the measurement space region is changed so that the position of the bottom surface becomes higher stepwisely according to the depth in the forward direction of the measurement space region.

9. The obstacle determining apparatus according to claim 6, wherein when the detection result of the inclination detecting portion indicates that the inclination of the distance measuring device is changed to a backward inclination direction, the measurement space region is changed so that the position of the bottom surface becomes lower stepwisely according to the depth in the forward direction of the measurement space region.

10. The obstacle determining apparatus according to claim 6, wherein when the detection result of the inclination detecting portion indicates that the inclination of the distance measuring device is changed to a forward inclination direction, the measurement space region is changed so that the position of the bottom surface becomes lower stepwisely according to the depth in the forward direction of the measurement space region.

11. The obstacle determining apparatus according to claim 7, wherein when the detection result of the inclination detecting portion indicates that the inclination of the distance measuring device is changed to a forward inclination direction, the position of the bottom surface of the measurement space region is maintained for a fixed time period.

12. The obstacle determining apparatus according to claim 6, wherein when the detection result of the inclination detecting portion indicates that the inclination of the distance measuring device is changed to a backward inclination direction, the measurement space region is changed so that the position of the bottom surface becomes higher stepwisely according to the depth in the forward direction of the measurement space region.

13. The obstacle determining apparatus according to claim 7, wherein when the detection result of the inclination detecting portion indicates that the inclination of the distance measuring device is changed to a backward inclination direction, the position of the bottom surface of the measurement space region is maintained for a fixed time period.

14. The obstacle determining apparatus according to claim 6, wherein when the detection result of the inclination detecting portion indicates that the inclination of the distance measuring device is changed to a left roll direction or a right roll direction, the measurement space region is changed so that the position of the bottom surface of the measurement space region becomes higher stepwisely according to a depth in a left direction or a right direction of the measurement space region.

15. The obstacle determining apparatus according to claim 6, wherein as a degree of the change of the inclination indicated by the detection result of the inclination detecting portion is greater, a degree of changing the position of the bottom surface stepwisely is set to be great.

16. The obstacle determining apparatus according to claim 1, further comprising
a position detecting device which detects a position of the distance measuring device and a map information holding portion, wherein
the measurement space region is changed so that the position of the bottom surface of the measurement space region changes stepwisely according to the depth in the forward direction and/or the width direction of the measurement space region based on current position information of the distance measuring device.

17. A moving body comprising an obstacle determining apparatus, a driving portion, and a drive control portion which controls the driving portion, wherein
the obstacle determining apparatus comprises a distance measuring device which measures a distance to a measurement object, and an obstacle determining portion which determines presence/absence of an obstacle in a measurement space region in front of the distance measuring device based on a measurement result of the distance by the distance measuring device,
the measurement space region is defined so that a position of a bottom surface of the measurement space region changes stepwisely or continuously according to a depth in a forward direction and/or a width direction of the measurement space region,
the measurement space region is a first region provided in at least an upper part on a near side in the measurement space region and a second region which is another region, and
the drive control portion controls the driving portion to stop the moving body when it is determined that there is an obstacle in the first region, and controls the driving portion to slow down the moving body when it is determined that there is an obstacle in the second region.

18. The moving body according to claim 17, further comprising
an inclination detecting portion which detects inclination of the distance measuring device, wherein
when a detection result of the inclination detecting portion indicates that the inclination of the distance measuring device is changed to a pitch direction and/or a roll direction, the measurement space region is changed so that the position of the bottom surface of the measurement space region changes stepwisely or continuously according to the depth in the forward direction and/or the width direction of the measurement space region.

19. An obstacle determining method having an obstacle determining step of determining presence absence of an obstacle in a measurement space region in front of a distance measuring device which measures a distance to a measurement object, based on a measurement result of the distance from the distance measuring device, wherein
the measurement space region is defined so that a position of a bottom surface of the measurement space region changes stepwisely according to a depth in a forward direction and/or a width direction of the measurement space region.

20. The obstacle determining method according to claim 19, further comprising
an inclination detecting step of detecting inclination of the distance measuring device, wherein
when a detection result at the inclination detecting step indicates that the inclination of the distance measuring device is changed to a forward inclination direction and/or a roll direction, the measurement space region is changed so that the position of the bottom surface of the measurement space region changes stepwisely according to the depth in the forward direction and/or the width direction of the measurement space region.

21. An obstacle determining apparatus comprising a distance measuring device which radiates measurement light to a predetermined irradiation region and measures a distance to a measurement object, and an obstacle determining portion which determines presence absence of an obstacle in a measurement space region in front of the distance measuring device based on a measurement result of the distance by the distance measuring device, wherein
the distance measuring device further comprises an inclination detecting portion which detects inclination of the distance measuring device, and
when a detection result of the inclination detecting portion indicates that the inclination of the distance measuring device is changed to a pitch direction and/or a roll direction, the measurement space region is changed so that a position of an bottom surface or an upper surface of the measurement space region changes in the irradiation region of the distance measuring device stepwisely or continuously according to the depth in the forward direction and/or the width direction of the measurement space region.

* * * * *